(12) United States Patent
Liang

(10) Patent No.: US 7,710,007 B2
(45) Date of Patent: May 4, 2010

(54) CONVERSION OF ULTRA-INTENSE INFRARED LASER ENERGY INTO RELATIVISTIC PARTICLES

(75) Inventor: Edison Liang, Houston, TX (US)

(73) Assignee: William Marsh Rice University, Houston, TX (US)

(*) Notice: Subject to any disclaimer, the term of this patent is extended or adjusted under 35 U.S.C. 154(b) by 688 days.

(21) Appl. No.: 11/675,147

(22) Filed: Feb. 15, 2007

(65) Prior Publication Data
US 2008/0111461 A1 May 15, 2008

Related U.S. Application Data

(63) Continuation of application No. PCT/US2005/029078, filed on Aug. 16, 2005.

(60) Provisional application No. 60/601,923, filed on Aug. 16, 2004.

(51) Int. Cl.
*H05H 1/54* (2006.01)
*H05H 15/00* (2006.01)

(52) U.S. Cl. .............. 313/231.31; 313/359.1; 250/423 R; 250/424; 250/251; 315/111.21; 315/111.61

(58) Field of Classification Search ............ 313/231.31, 313/359.1; 250/423 R, 424, 251; 315/111.21
See application file for complete search history.

(56) References Cited

U.S. PATENT DOCUMENTS

| 3,628,342 A | * | 12/1971 | Becker ......................... 62/600 |
| 6,680,480 B2 | | 1/2004 | Schoen |
| 2007/0056262 A1 | * | 3/2007 | Leach et al. ................... 60/204 |

* cited by examiner

*Primary Examiner*—Nikita Wells
(74) *Attorney, Agent, or Firm*—Baker Botts L.L.P.

(57) ABSTRACT

Devices and methods for producing relativistic particles are provided. The devices and methods involve collision of a thin collimated plasma layer from opposite sides with two counter-propagating ultra-intense laser (UL) electromagnetic (EM) pulses. The plasma layer is sufficiently thin so that the pulses penetrate and conjointly propagate through the plasma layer. The Lorenz force between induced skin currents and the magnetic field of the propagating pulses accelerates a number of "in-phase" plasma particles to relativistic velocities.

21 Claims, 17 Drawing Sheets

CONVERSION OF ULTRA-INTENSE INFRARED LASER ENERGY INTO RELATIVISTIC PARTICLES

CROSS-REFERENCE TO RELATED APPLICATION

Figure 1A:
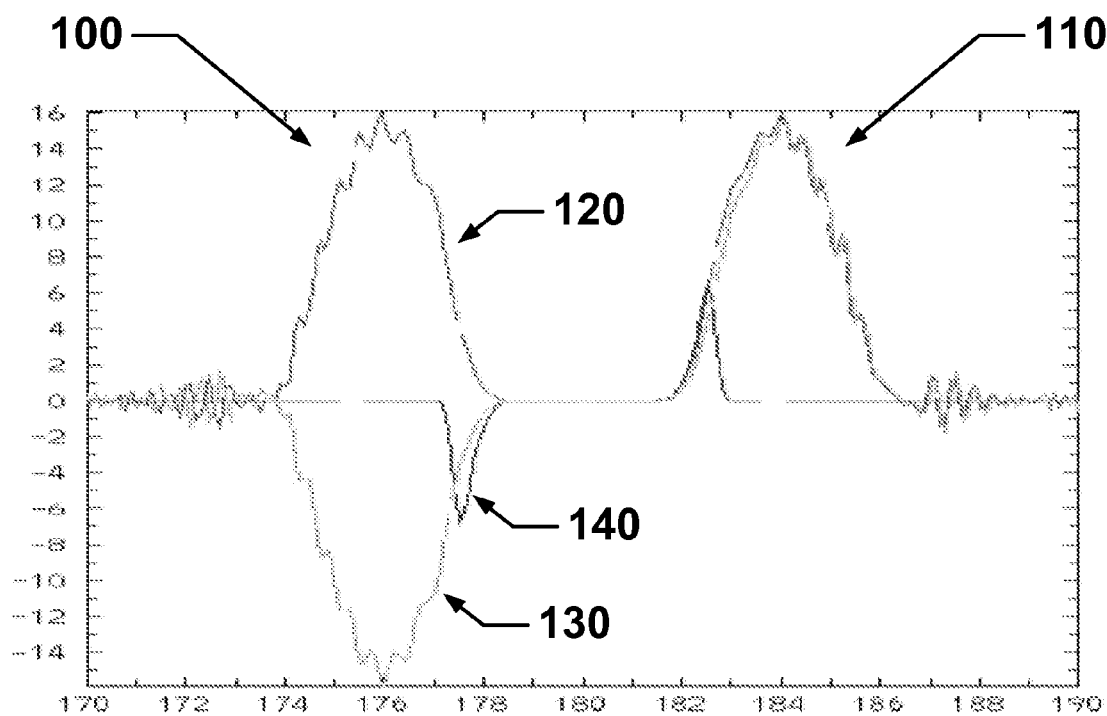
Figure 1F:
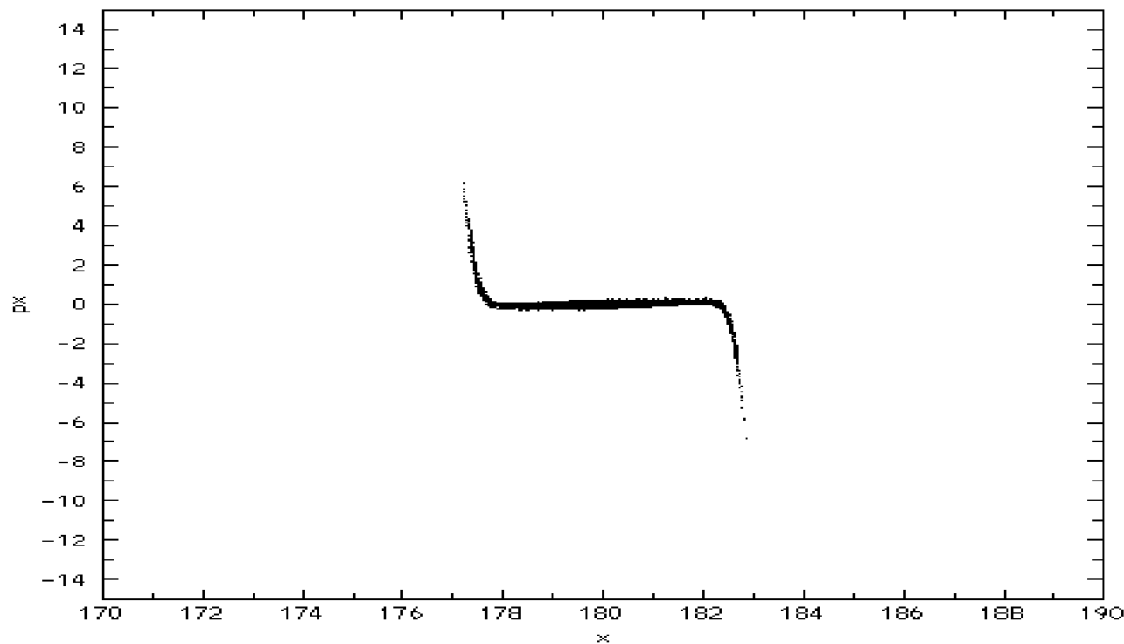

This application is a continuation of International Patent Application No. PCT/US2005/029078, filed Aug. 16, 2005, which claims the benefit of U.S. Provisional Patent Application Ser. No. 60/601,923, filed Aug. 16, 2004.

STATEMENT OF GOVERNMENT INTEREST

This disclosure was developed at least in part using funding from the National Aeronautics and Space Administration Goddard Space Flight Center, under Contract No. NAG5-7980, and the Lawrence Livermore National Laboratory, under Contract No. B528326. The U.S. government may have certain rights in the invention.

BACKGROUND

The present invention relates generally to the production of relativistic particles, and, more particularly, to the production of relativistic particles by colliding a plasma with electromagnetic pulses.

The sustainable acceleration of charged particles is a major challenge in both basic plasma physics and astrophysics. Current conventional particle accelerators have an energy gain per distance of only about 1GeV/m. Recent advances in ultra-intense lasers (ULs) (e.g., with intensity $I>2\times10^{18} Wcm^{-2}$) open up a new frontier in the acceleration of particles via intense electromagnetic (EM) fields. (See e.g., G. A. Mourou, C. P. J. Barty, M. D. Perry, *Phys. Today* 51(1), 22 (1998), the *SAUUL Report*, T. Ditmire, Ed. (UT Austin, 2003), for and by L Lontano et al., Eds., *Superstrong Fields in Plasmas, AIP Conf. Proc.* No. 611 (AIP, NY 2002)).

Most proposed laser acceleration schemes, for example, Laser Wake Field Acceleration (LWFA), Plasma Wake Field Acceleration (PWFA), Plasma Beat Wave Acceleration (PBWA), as described by E. Esarey, P. Sprangle, J. Krall, A. Ting, IEEE Trans. Plasma Sci. 24, 252 (1996), P. Sprangle, E. Esary, A. Ting, *Phys. Rev. Lett.* 64, 2011 (1990), V. Malka, in *AIP Conf. Proc.* No. 611, p. 303, Ed. M. Lontano et al. (AIP, NY, 2002), A. Pukhov, J. Meyer-ter-Vehn, *Phys. Rev. Lett.* 79, 2686 (1997), T. Tajima and J. M. Dawson, *Phys. Rev. Lett.* 43, 267 (1979), and Free Wave Acceleration (FWA), as described by M. S. Hussein, M. P. Pato, A. K. Kerman, *Phys. Rev. A* 46, 3562 (1992), M. S. Hussein, M. P. Pato, *Phys. Rev. Lett.* 68, 1992, S. Kawata, T. Maruyama, H. Watanabe, I. Takahashi, *Phys. Rev. Lett.* 66, 2072 (1991), J. G. Woodworth, M. N. Kreisler, A. K. Kerman, *The Future of Accelerator Phys.* p. 378, Ed. T. Tajima (AIP, N.Y. 1996), involve the propagation of lasers in an underdense plasma $(\omega_{pe}=(4\pi n e^2/m_e)^{1/2}<\omega_o=2\pi c/\lambda$, where $\lambda$=laser wavelength, $m_e$ is the rest mass of an electron $e^-$ or a positron $e^+$, e is the absolute value of the electric charge of an electron $e^-$ or a positron $e^+$, c is the speed of light in a vacuum, and n=electron density). In such schemes both the acceleration gradient (energy gain/distance) and the particle beam intensity are limited by the underdense plasma requirement. (See e.g., E. Esarey, P. Sprangle, J. Krall, A. Ting, IEEE Trans. Plasma Sci. 24, 252 (1996), P. Sprangle, E. Esary, A. Ting, *Phys. Rev. Lett.* 64, 2011 (1990), V. Malka, in *AIP Conf. Proc.* No. 611, p. 303, Ed. M. Lontano et al. (AIP, NY, 2002), A. Pukhov, J. Meyer-ter-Vehn, *Phys. Rev. Lett.* 79, 2686 (1997), T. Tajima and J. M. Dawson, *Phys. Rev. Lett.* 43, 267 (1979)).

When a single ultra-intense laser (UL) irradiates a plasma surface through a variety of nonlinear collisionless processes, as described, for example, by W. L. Kruer, E. J. Valeo, K. G. Estabrook, *Phys. Rev. Lett.* 35, 1076 (1975), W. L. Kruer, K. G. Estabrook, *Phys. Fluids* 28, 430 (1985), and S. C. Wilks, W. L. Kruer, M. Tabak, A. B. Langdon, *Phys. Rev. Lett.* 69, 1383 (1992), the single ultra-intense laser (UL) as described, for example, by S. C. Wilks, W. L. Kruer, M. Tabak, A. B. Langdon, *Phys. Rev. Lett.* 69, 1383 (1992), and A. Pukhov, J. Meyer-ter-Vehn, *Phys. Rev. Lett.* 79, 2686 (1997), couples a significant fraction of the energy of the single ultra-intense laser (UL) to superthermal electrons with characteristic energy E given by the Lorentz relativistic gamma factor $\gamma=E/(511 keV)\sim(1+I\lambda^2/1.4\times10^{18}Wcm^{-2})^{1/2}-1$, where I is the laser intensity in Watts/cm$^2$ and $\lambda$ is the laser wavelength in $\mu m$,.

If the plasma is a slab of electron-positron ($e^+e^-$) pairs, in addition to the collisionless heating, the light pressure will also snowplow the $e^+e^-$ pairs with a bulk velocity determined by momentum conservation, as described, for example, by W. L. Kruer, E. J. Valeo, K. G. Estabrook, *Phys. Rev. Lett.* 35, 1076 (1975). For $\lambda=1\ \mu m$ and $I=10^{21}W/cm^2$, particle-in-cell (PIC) simulations, which are described, for example, by S. C. Wilks, W. L. Kruer, M. Tabak, A. B. Langdon, *Phys. Rev. Lett.* 69, 1383 (1992), A. Pukhov, J. Meyer-ten-Vehn, *Phys. Rev. Lett.* 79, 2686 (1997), and E. P. Liang, S. C. Wilks, M. Tabak, *Phys. Rev. Lett.* 81, 4887 (1998), show that the electrons can be accelerated to greater than about 10MeV. This has been confirmed with experiments, as described, for example, by S. P. Hatchett et al. *Phys. Plasmas* 7, 2076 (2000), K. W. D. Ledingham et al. *Phys. Rev. Lett.* 84, 899 (2000). and T. E. Cowan et al., *Phys. Rev. Lett.* 84, 903 (2000).

In a conventional laser ponderomotive accelerator in which a single ultra-intense laser (UL) strikes an overdense $e^+e^-$ plasma surface, as described, for example, by S. C. Wilks, W. L. Kruer, M. Tabak, A. B. Langdon, *Phys. Rev. Lett.* 69, 1383 (1992), all upstream particles share the momentum of the Poynting flux. For a laser wavelength $\lambda=1\ \mu m$ and an ultra-intense laser (UL) intensity $I=10^{21}W/cm^2$, in conventional laser ponderomotive heating, the Lorentz relativistic gamma factor $\gamma$ may reach only $\gamma\sim\Omega_e/\omega_o\sim30$, where $\Omega_e=eB/m_ec$ is equal to the electron gyrofrequency in the laser magnetic field B, $m_e$ is the rest mass of an electron $e^-$ or a positron $e^+$, e is the absolute value of the electric charge of an electron $e^-$ or a positron $e^+$, c is the speed of light in a vacuum, and $\omega_o$ is equal to the laser frequency. (See e.g., W. L. Kruer, K. G. Estabrook, *Phys. Fluids* 28, 430 (1985) and S. C. Wilks, W. L. Kruer, M. Tabak, A. B. Langdon, *Phys. Rev. Lett.* 69, 1383 (1992)). A Diamagnetic Relativistic Pulse Accelerator (DRPA) of an overdense plasma has been proposed, as described, for example, by E. Liang, K. Nishimura, H. Li, S. P. Gary, *Phys. Rev. Lett.* 90, 085001 (2003), E. Liang, K. Nishimura, *Phys. Rev. Lett.* 92, 175005 (2004), and K. Nishimura, E. Liang, *Phys. Plasmas,* 11 (10) (2004). However, the Diamagnetic Relativistic Pulse Accelerator (DRPA) is difficult and expensive to realize practically.

High-energy gamma-ray ($\gamma$-ray) beams are conventionally only produced by large conventional particle accelerators (e.g., synchrotron sources) at national research facilities. Both the intensity of the high-energy gamma-ray ($\gamma$-ray) beams produced by the large conventional particle accelerators, and the energy conversion efficiency, are relatively low. Consideration is now being given to the design of particle accelerators that can produce relativistic particles. In particular, attention is being directed to the production of relativistic particles by colliding a plasma with electromagnetic pulses.

SUMMARY

The present invention relates to the production of relativistic particles, and, more particularly, to the production of relativistic particles by colliding a plasma with electromagnetic pulses.

Accelerators and methods for the production of relativistic particles are provided. The accelerators and methods involve producing a plasma and collimating the plasma. At least a portion of the collimated plasma is struck substantially simultaneously with two counter-propagating ultra-intense laser (UL) electromagnetic (EM) pulses to accelerate particles in the plasma to about relativistic velocities (i.e. velocities at which the particles exhibit relativistic behavior.

In suitable implementations of the accelerators and methods, the plasma may be produced by striking a foil (e.g., a high-Z material foil) with a pulse from a petawatt laser. The produced plasma may be an $e^+e^-$ plasma, an $e^-$-ion plasma, or a plasma composed of other suitable charged particle species. The produced plasma is collimated into a thin slab, which is no thicker than about a wavelength of the ultra-intense laser (UL) before being simultaneously struck by the counter-propagating UL pulses.

The features and advantages of the present invention will be readily apparent to those skilled in the art upon a reading of the description of the present disclosure, including the illustrative embodiments that follow.

DRAWINGS

The following figures form part of the present specification and are included to further demonstrate certain aspects of the present invention. The present invention may be better understood by reference to one or more of these drawings in combination with the description of embodiments presented herein.

Figure 1B:
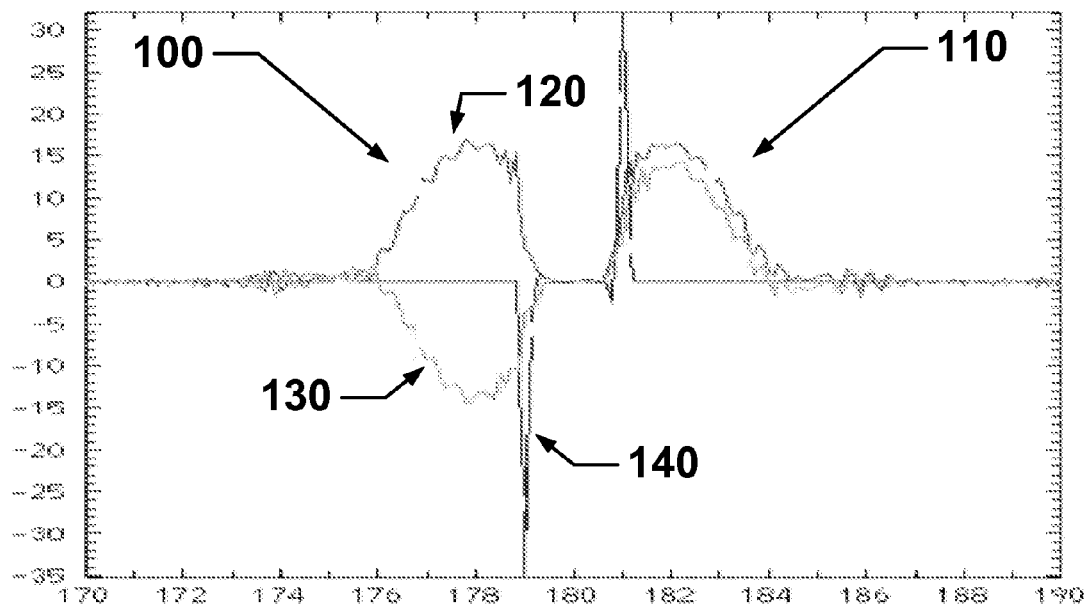
Figure 1G:
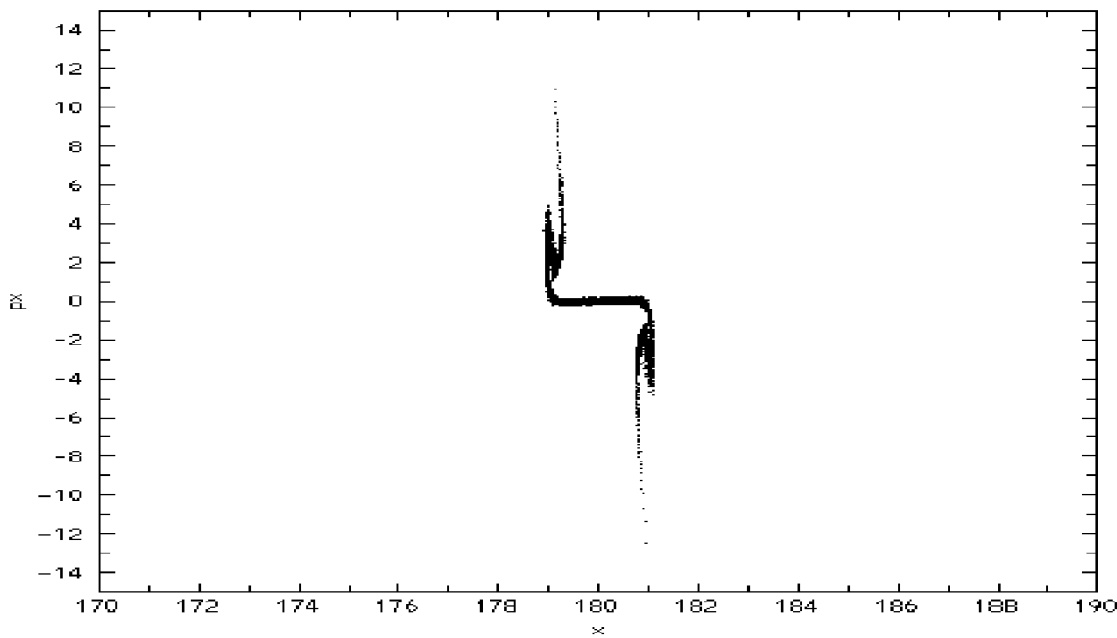
Figure 1C:
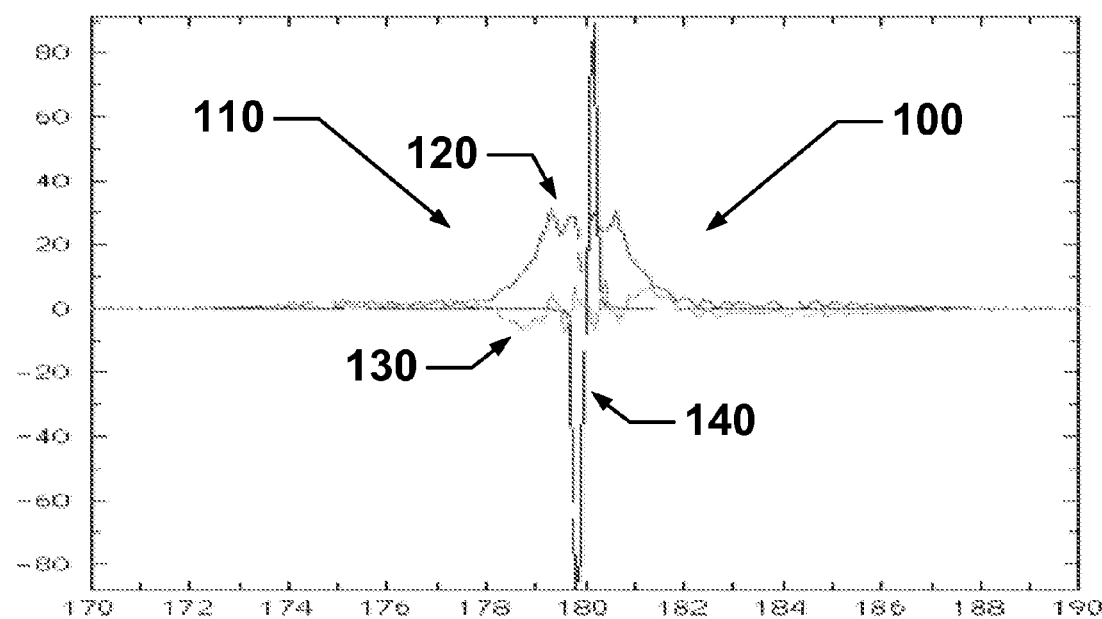
Figure 1H:
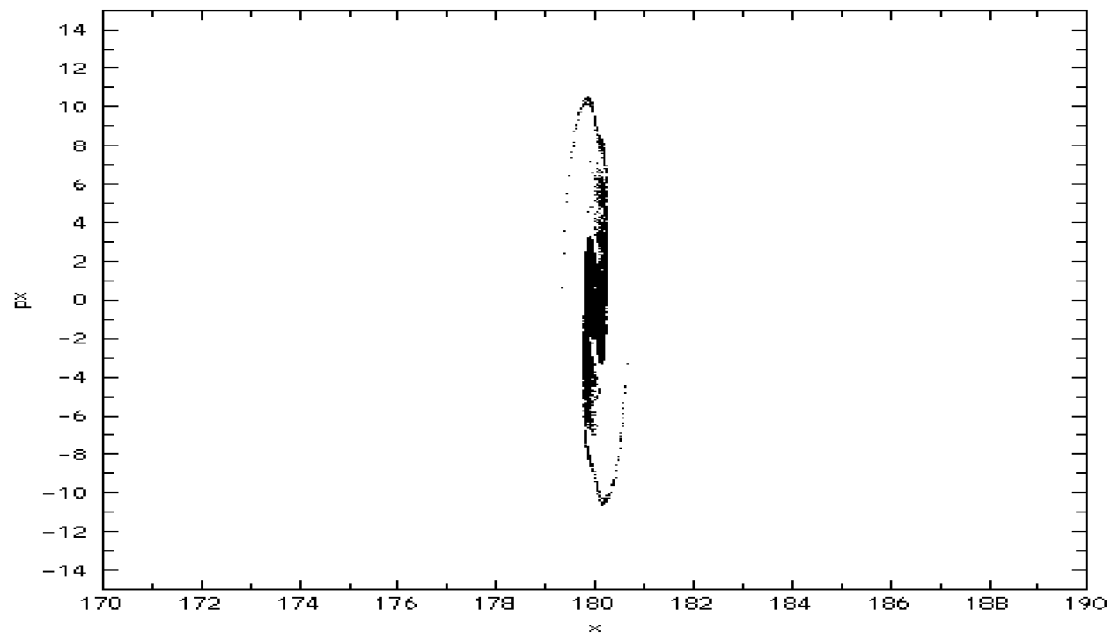
Figure 1D:
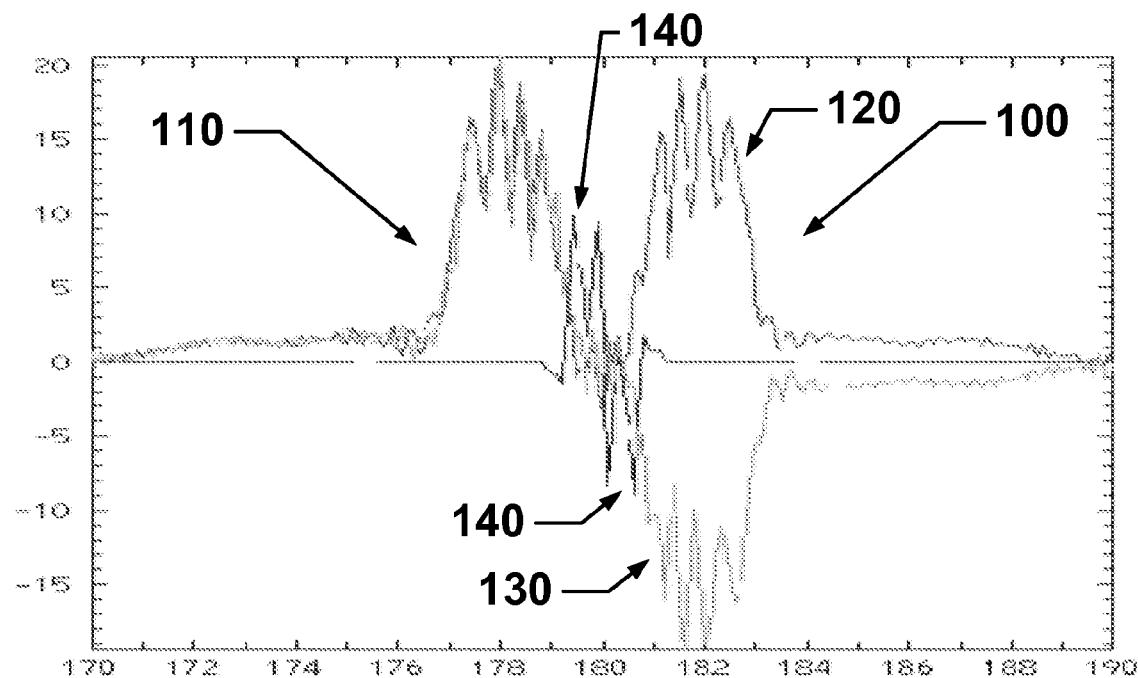
Figure 1I:
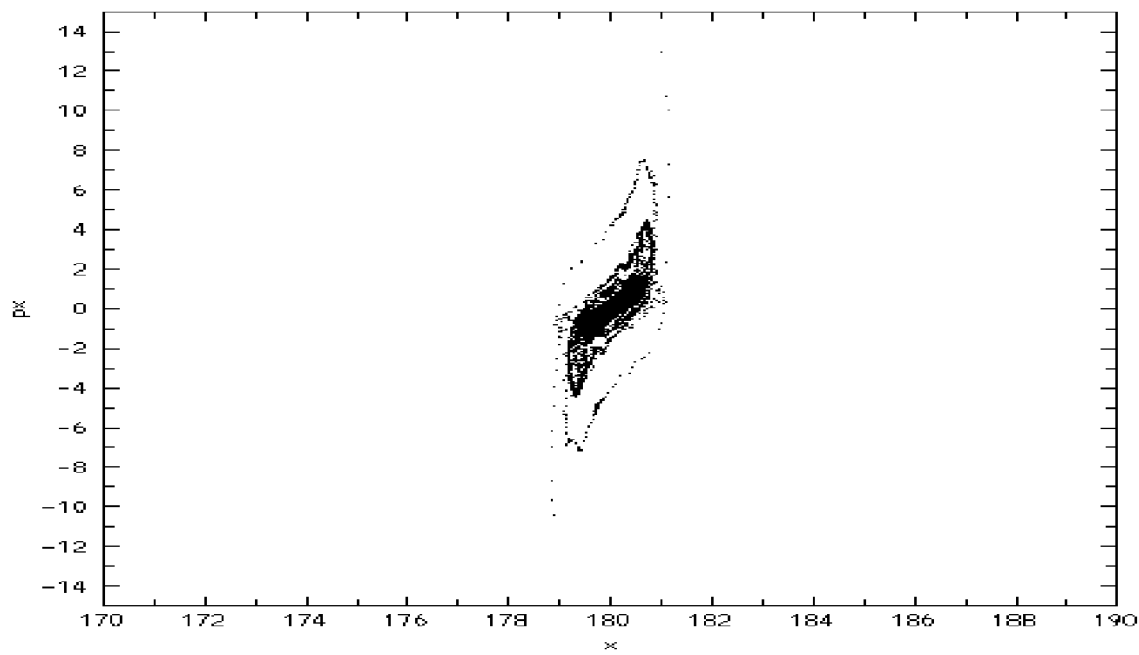
Figure 1E:
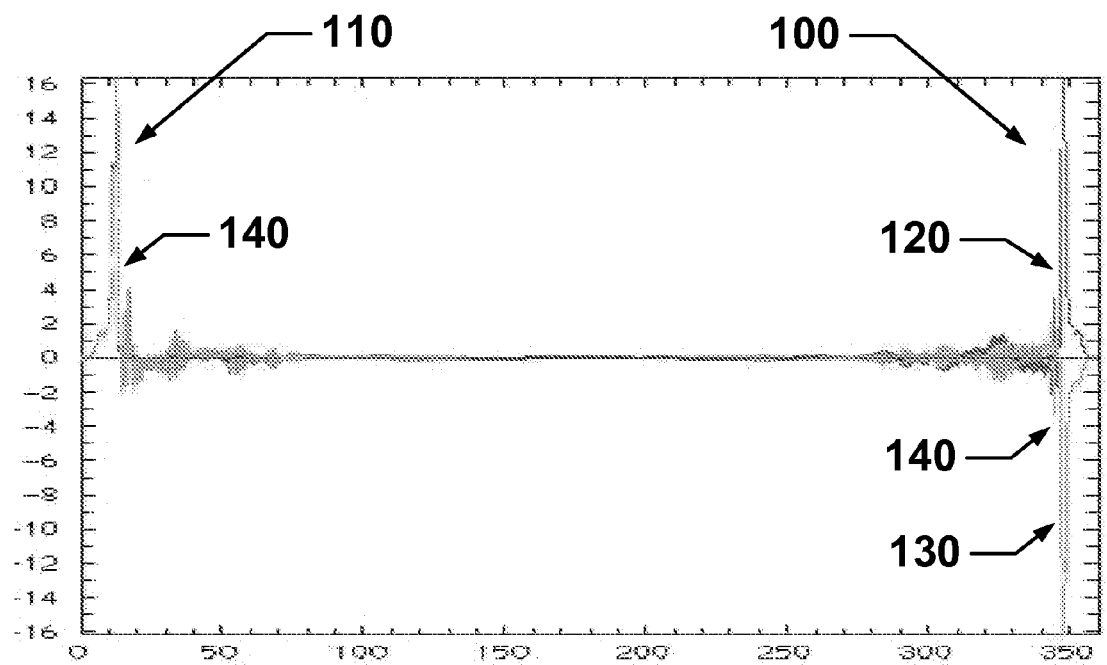
Figure 1J:
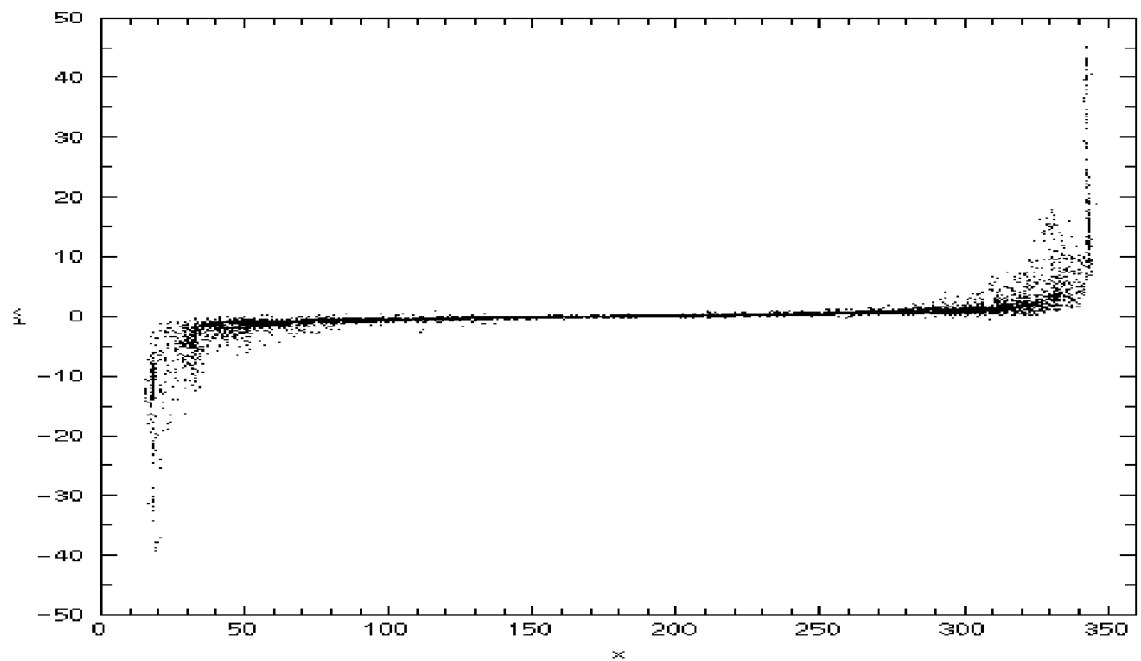
Figure 2:
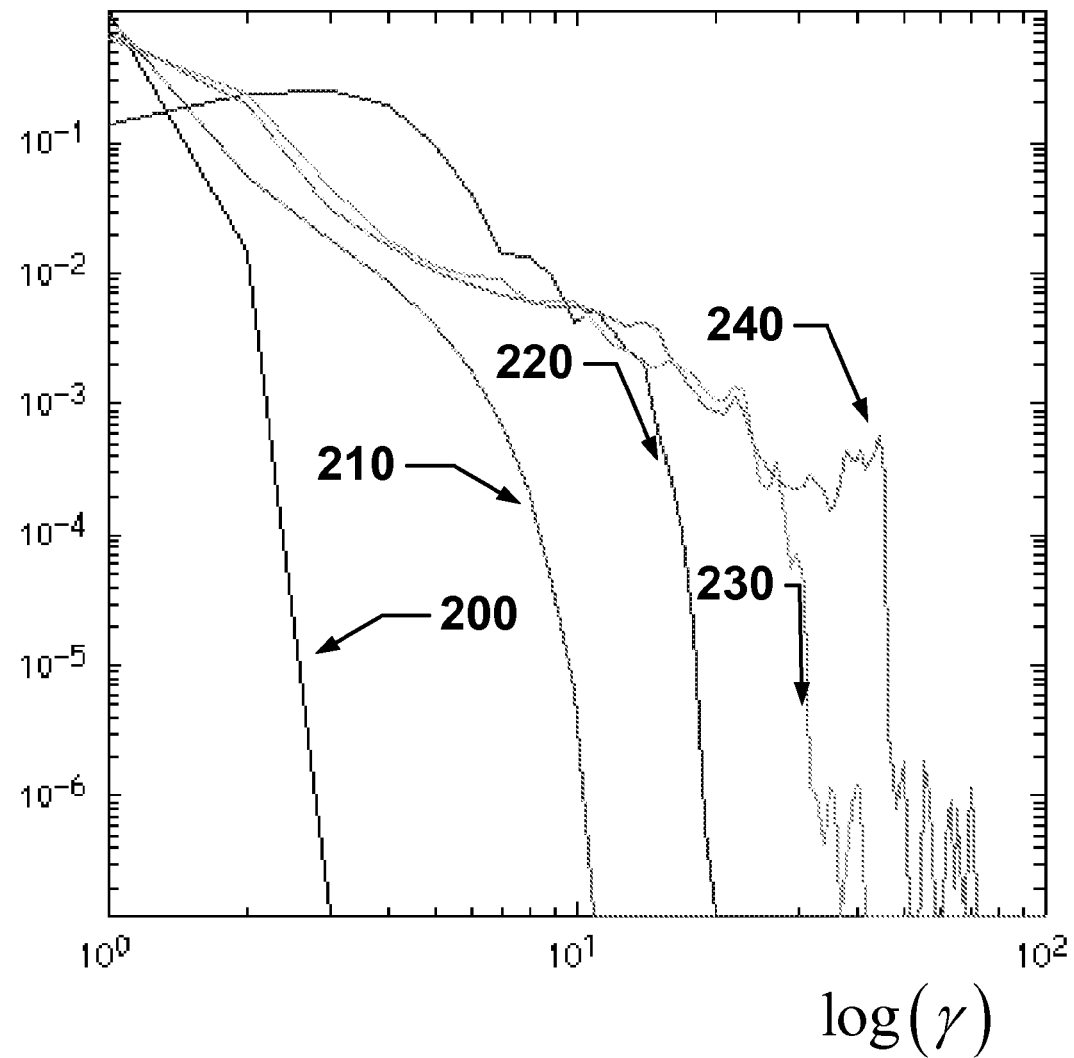
Figure 3A:
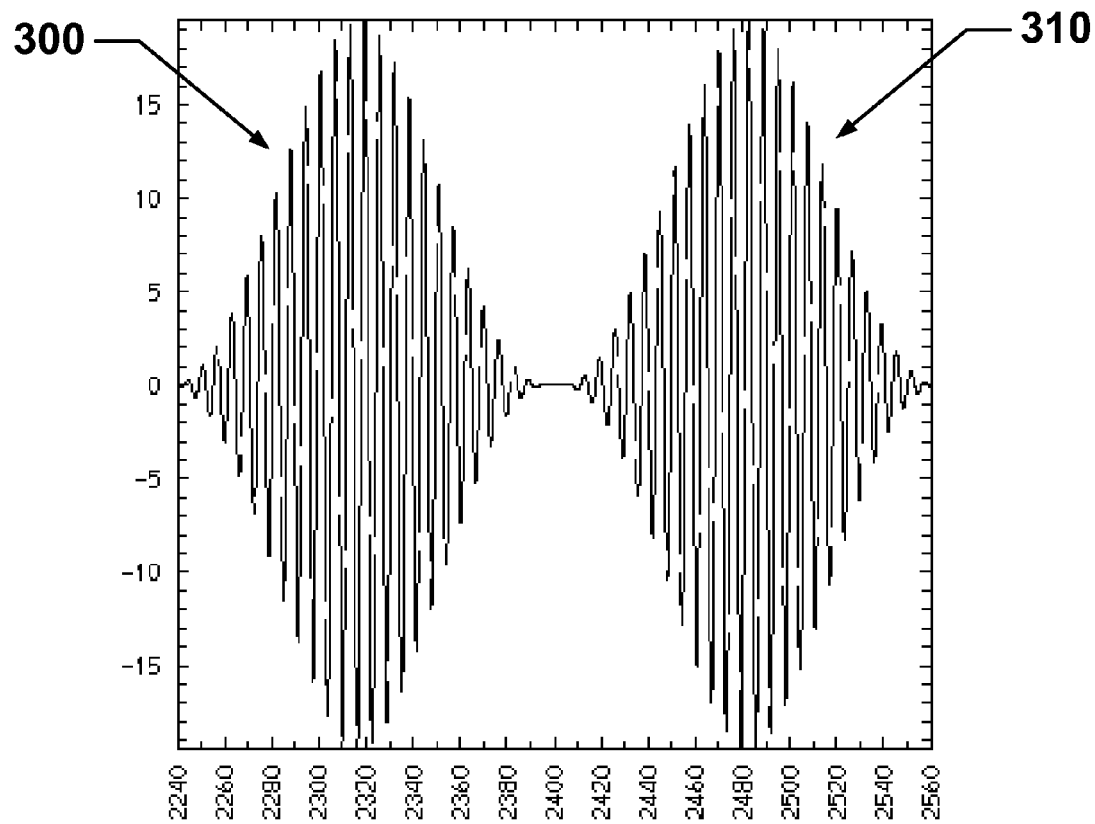
Figure 3B:
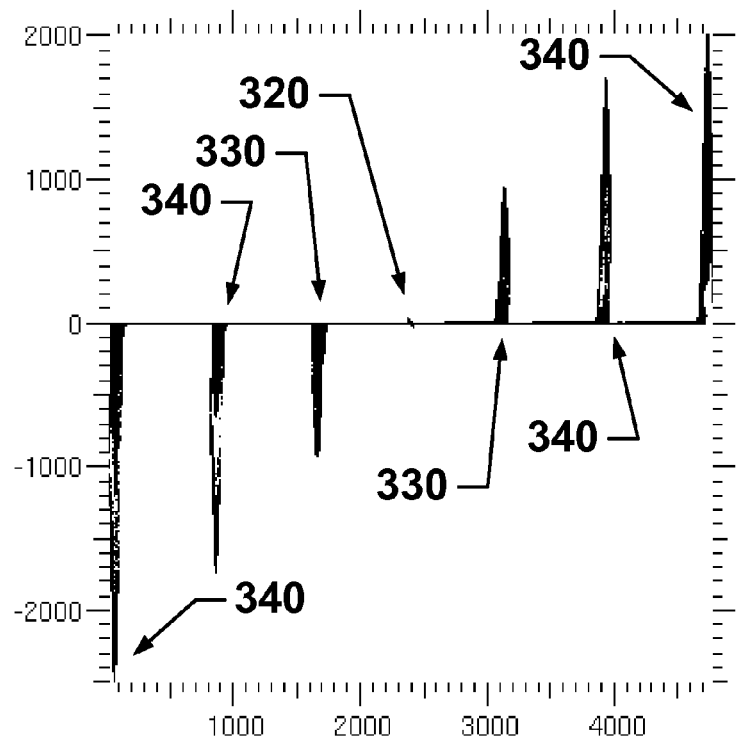

Consequently, a more complete understanding of the present disclosure and advantages thereof may be acquired by referring to the following description taken in conjunction with the accompanying drawings, in which the leftmost significant digit(s) in the reference numerals denote(s) the first figure in which the respective reference numerals appear, wherein:

FIGS. 1a-1j schematically illustrate time-lapse snapshots of two ultra-intense laser (UL) electromagnetic (EM) pulses colliding normally with an $e^+e^-$ plasma centered at x=180, at $t\omega_o/2\pi$=1, 1.25, 1.5, 1.75, 22.5 (as shown in FIG. 1a, the two ultra-intense laser (UL) electromagnetic (EM) pulses strike the initial $e^+e^-$ plasma when $t\omega_o=2\pi$, where $\omega_o$ is equal to the laser frequency), in accordance with the principles of the present invention. The initial density of the $e^+e^-$ plasma is $n=15n_{cr}$, where $n_{cr}$ is the critical density at which the electron positron $e^+e^-$ plasma frequency $\omega_{pe}=(4\pi ne^2/m_e)^{1/2}$ is equal to the ultra-intense laser (UL) frequency $\omega_o$, the initial thermal energy of the $e^+e^-$ plasma is kT=2.6 keV, the initial $e^+e^-$ plasma thickness is equal to 0.5 μm, the ultra-intense laser (UL) wavelength is λ=1 μm, and the ultra-intense laser (UL) intensity is $I=10^{21}$W/cm$^2$. FIGS. 1a-1e show snapshots of the ultra-intense laser (UL) magnetic field B (120), the ultra-intense laser (UL) electric field E (130), and the current density J (140). FIGS. 1f-1j show respective snapshots of phase plots of $p_x/m_ec$ vs. x, where $p_x$ is the component of the $e^+e^-$ particle momentum p in the x direction;

FIG. 2 schematically illustrates an evolution of the logarithm of the electron energy distribution $f(\gamma)$, log($f(\gamma)$), vs. the logarithm of γ, log(($\gamma$)), (where γ is the Lorentz relativistic gamma factor) for the UL pulses-plasma collision shown in FIGS. 1a-1j, showing the power-law with slope~−2 at late-times, where $t\omega_o/2\pi$=0(200), 1(210), 1.5(220), 10(230), 22.5 (240), respectively;

FIGS. 3a and 3b schematically illustrate results of two Gaussian ultra-intense laser (UL) electromagnetic (EM) pulse trains striking an $e^+e^-$ plasma centered at x=2400, in accordance with the principles of the present invention. The initial $e^+e^-$ plasma thickness is equal to 0.5 μm, the initial density of the $e^+e^-$ plasma is $n=9n_{cr}$, or about $n=9.9\times10^{21}$ cm$^{-3}$ here, given that $n_{cr}=1.1\times10^{21}$cm$^{-3}$ when the ultra-intense laser (UL) wavelength λ=1 μm, the initial thermal energy of the $e^+e^-$ plasma is kT=2.6 keV, the ultra-intense laser (UL) wavelength λ=1 μm, the gaussian pulse length is equal to 85 femtoseconds (fs), and the ultra-intense laser (UL) intensity is $I=10^{21}$Wcm$^{-2}$. The maximum Lorentz relativistic gamma factor $\gamma_{max}$ reaches 2500 at 1.28 ps after the ultra-intense laser (UL) strikes the $e^+e^-$ plasma surface.

Figure 4A:
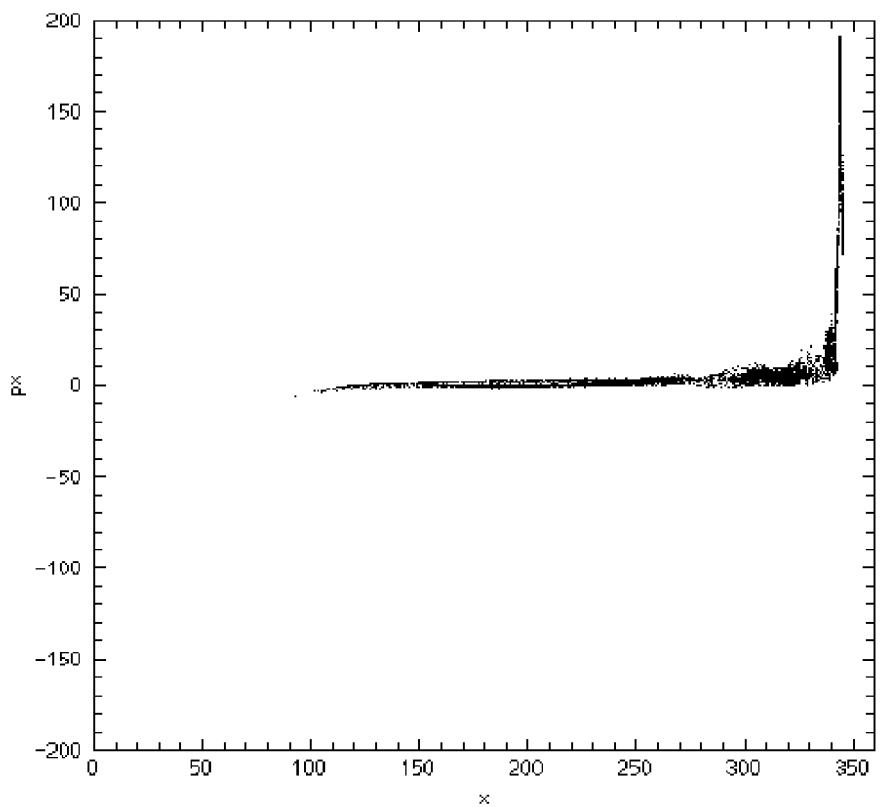
Figure 4B:
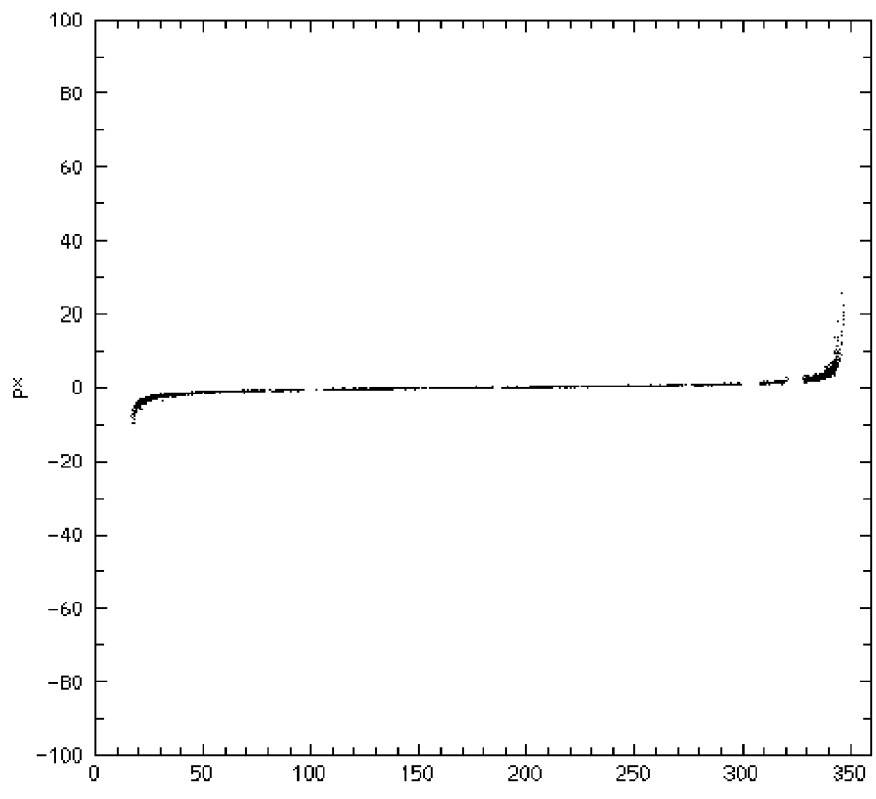

FIG. 3a shows an initial profile of ultra-intense laser (UL) electromagnetic (EM) pulses and FIG. 3b shows phase plots at $t\omega_o$=20, 820, 1620, 2420 after pulses strike the $e^+e^-$ plasma, showing the increase of the maximum Lorentz relativistic gamma factor $\gamma_{max}$ with time. The maximum energy reaches ~1.3 GeV at a distance of only 385 μm;

FIGS. 4a and 4b schematically illustrates phase plots at $t\omega_o/2\pi$=22.5 of two unequal ultra-intense laser (UL) electromagnetic (EM) pulses striking an $e^+e^-$ plasma centered at x=180, in accordance with the principles of the present invention. The $e^+e^-$ plasma targets for FIGS. 4a and 4b are the same (except for the initial densities of the respective $e^+e^-$ plasmas) as the $e^+e^-$ plasma target for FIGS. 3a and 3b, where the initial $e^+e^-$ plasma thickness is equal to 0.5 μm, the initial thermal energy of the $e^+e^-$ plasma is kT=2.6 keV, the ultra-intense laser (UL) wavelength λ=1 μm, and the gaussian pulse length is equal to 85 femtoseconds (fs).

Figure 5:
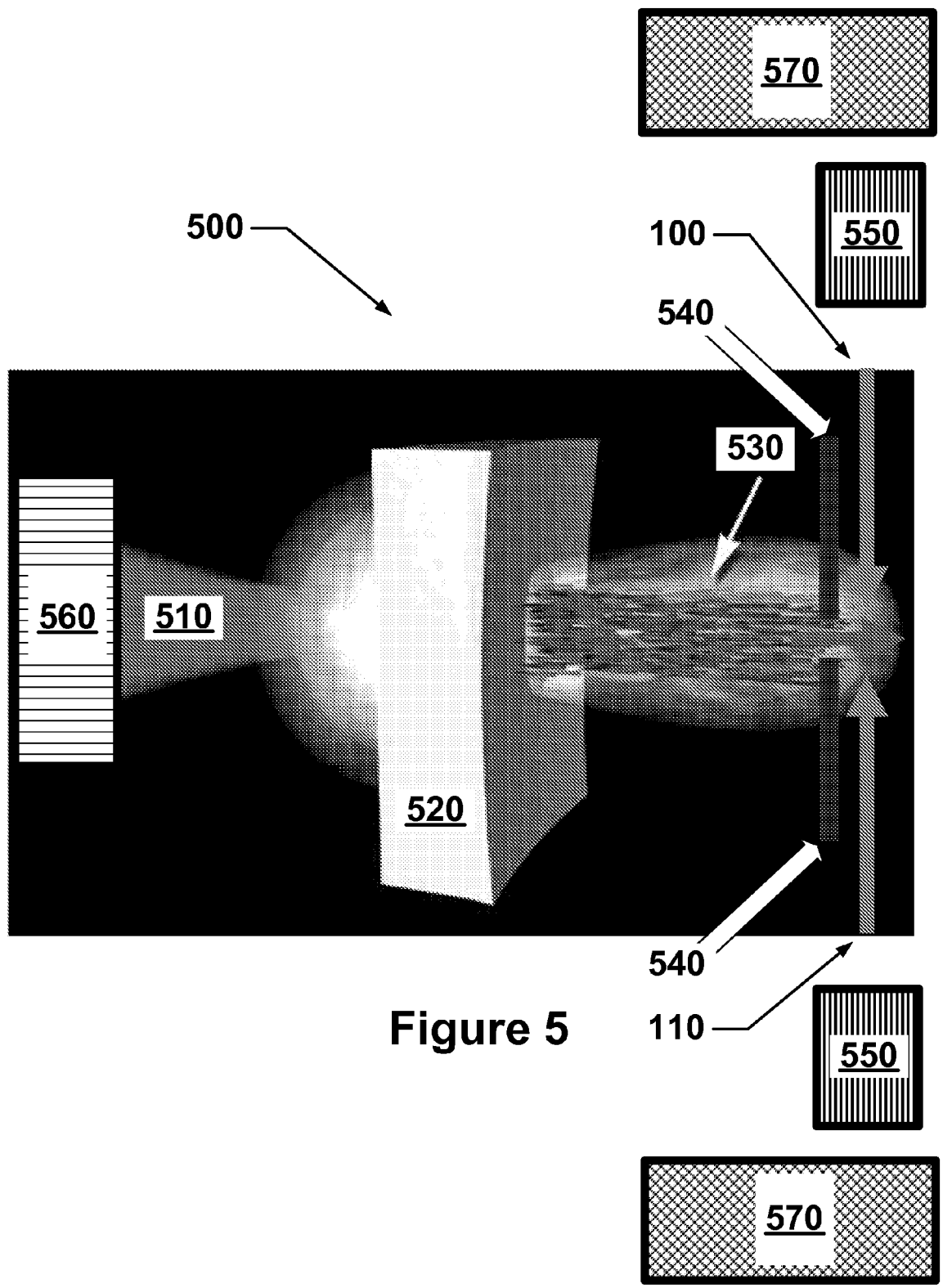
Figure 6:
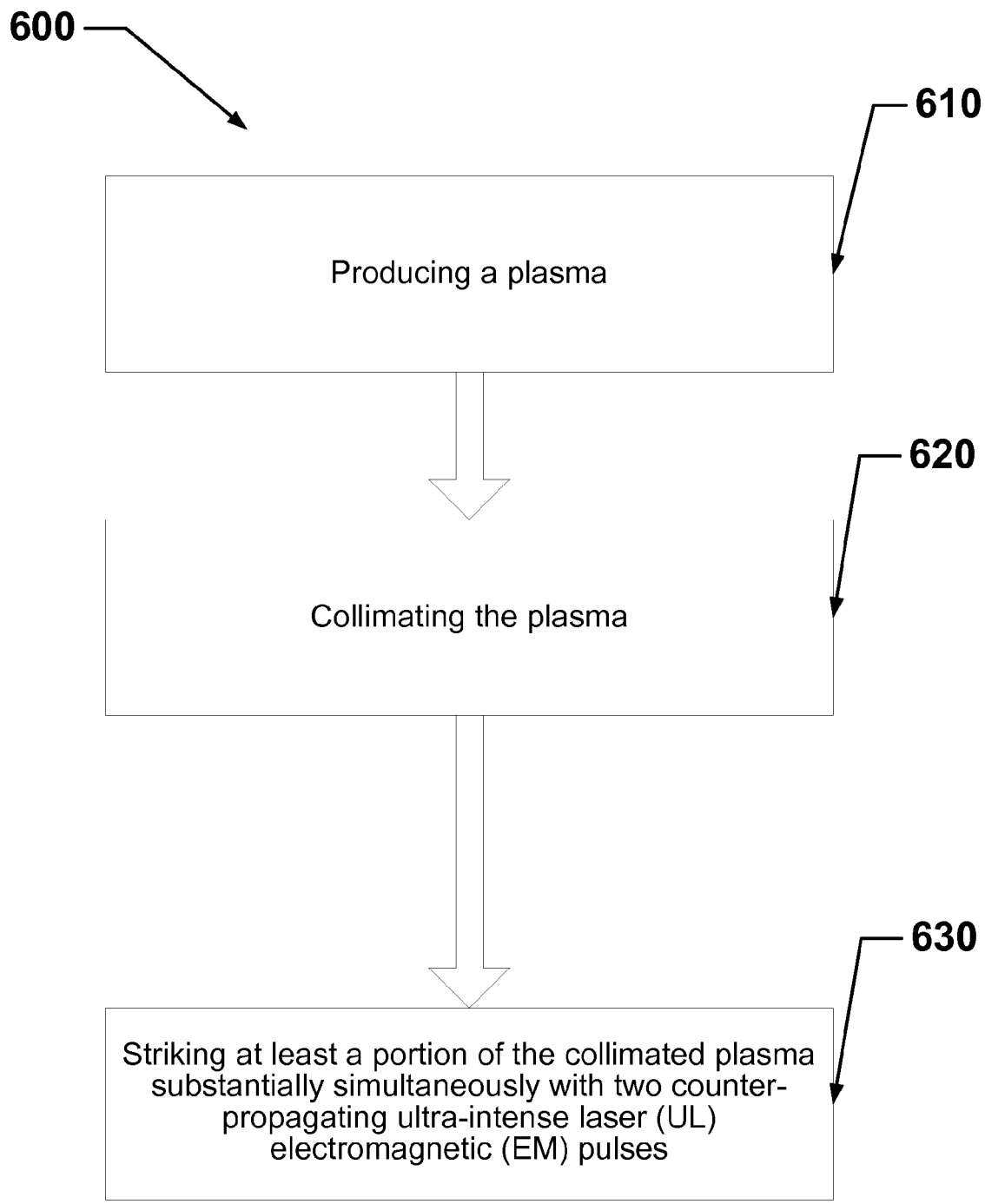

FIG. 4a shows the result of irradiating the $e^+e^-$ plasma target, having an initial density of the $e^+e^-$ plasma $n=0.04n_{cr}$, with ultra-intense laser (UL) electromagnetic (EM) pulses of unequal intensities: an ultra-intense laser (UL) intensity $10^{21}$ Wcm$^{-2}$ propagating to the right and an ultra-intense laser (UL) intensity $8\times10^{20}$ Wcm$^{-2}$ propagating to the left. Remarkably, most of the accelerated $e^+e^-$ particles are accelerated by the right-moving more intense pulse, and the left-moving less intense pulse decouples early from the plasma with little $e^+e^-$ particle acceleration. FIG. 4b shows the result of the same unequal ultra-intense laser (UL) electromagnetic (EM) pulses as shown in FIG. 4a irradiating a much denser $e^+e^-$ plasma target slab, having an the initial density of the $e^+e^-$ plasma $n=25n_{cr}$, (or approximately $n=2.75\times10^{22}$/cm$^3$, for an $e^+e^-$ plasma target slab 0.5 μm thick);

FIG. 5 schematically illustrates an exemplary embodiment of a colliding pulse accelerator (CPA), in accordance with the principles of the present invention;

FIG. 6 schematically illustrates an exemplary embodiment of a method for accelerating particles relativistically using a colliding pulse accelerator (CPA), in accordance with the principles of the present invention.

Figure 7A:
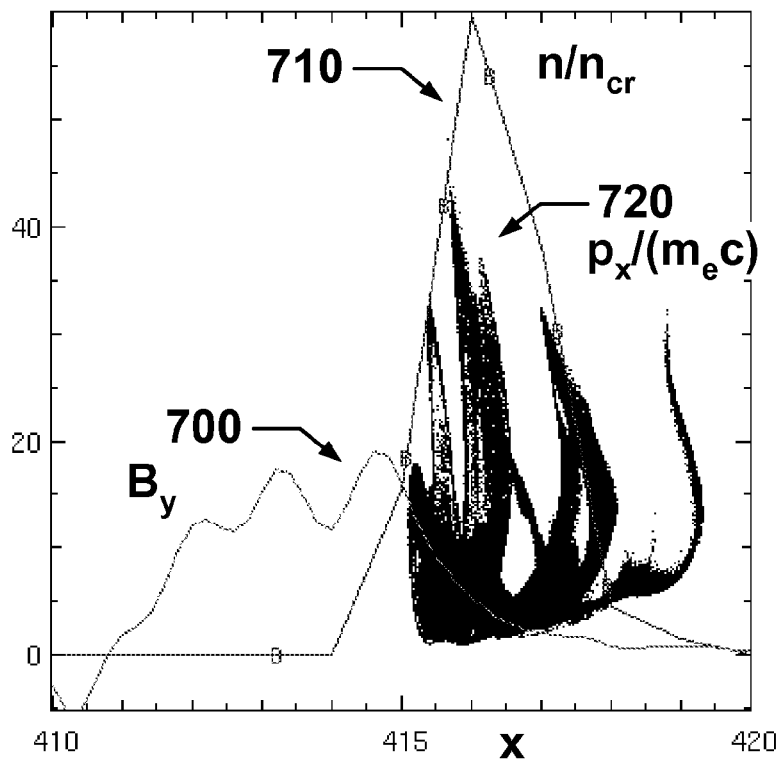
Figure 7B:
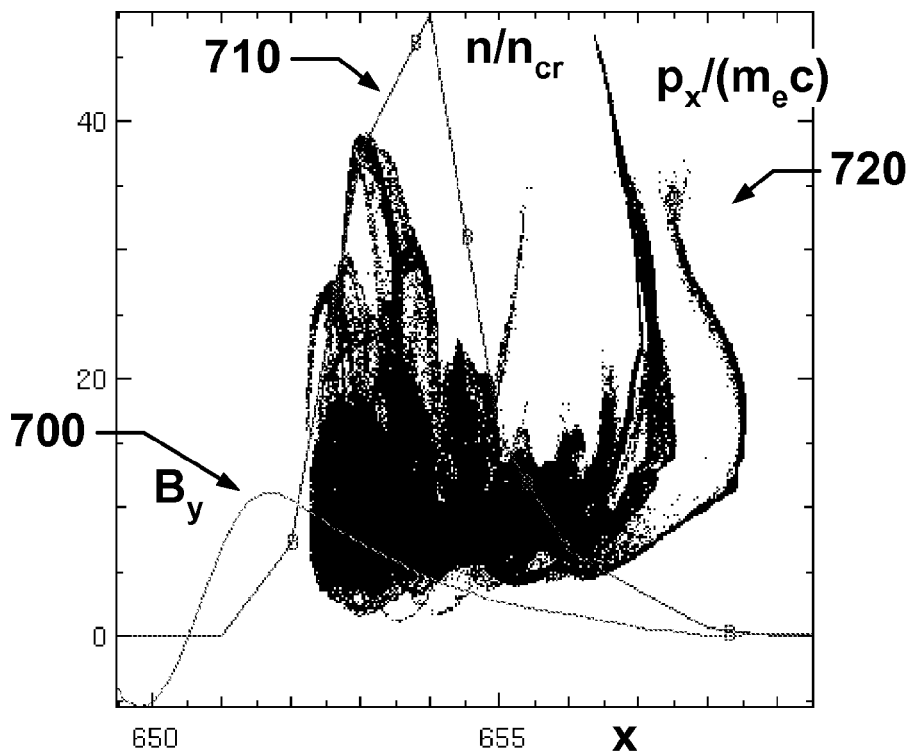
Figure 8A:
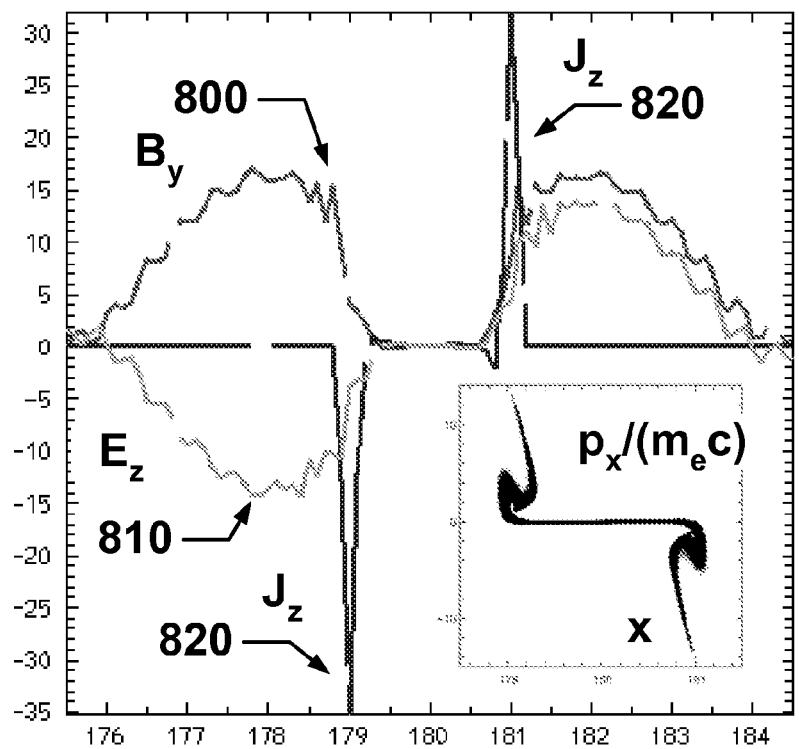
Figure 8B:
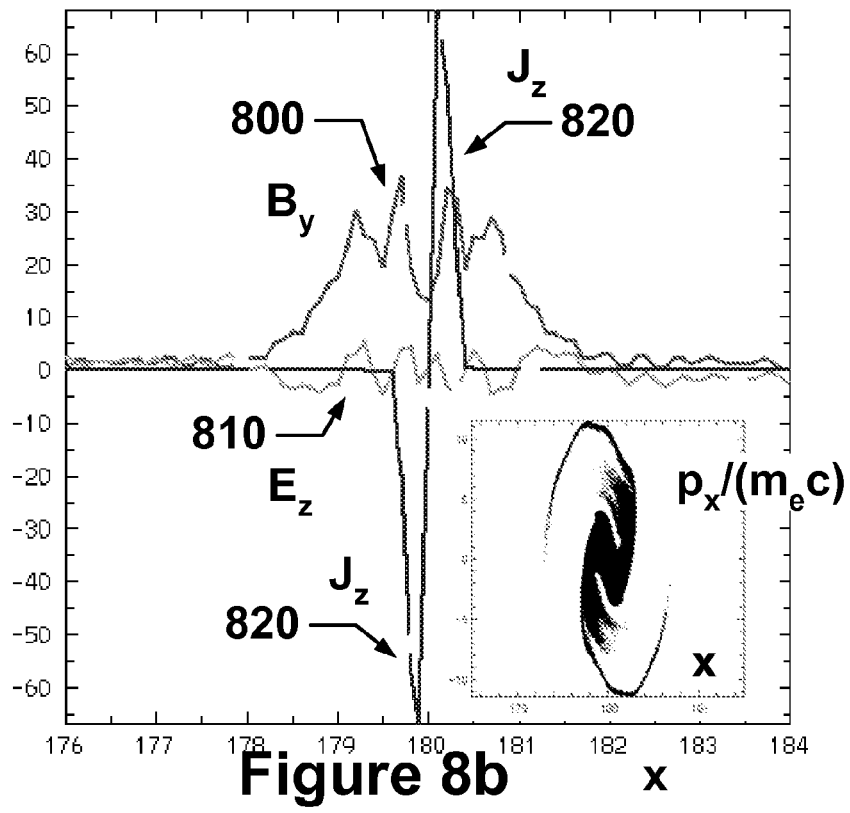
Figure 8C:
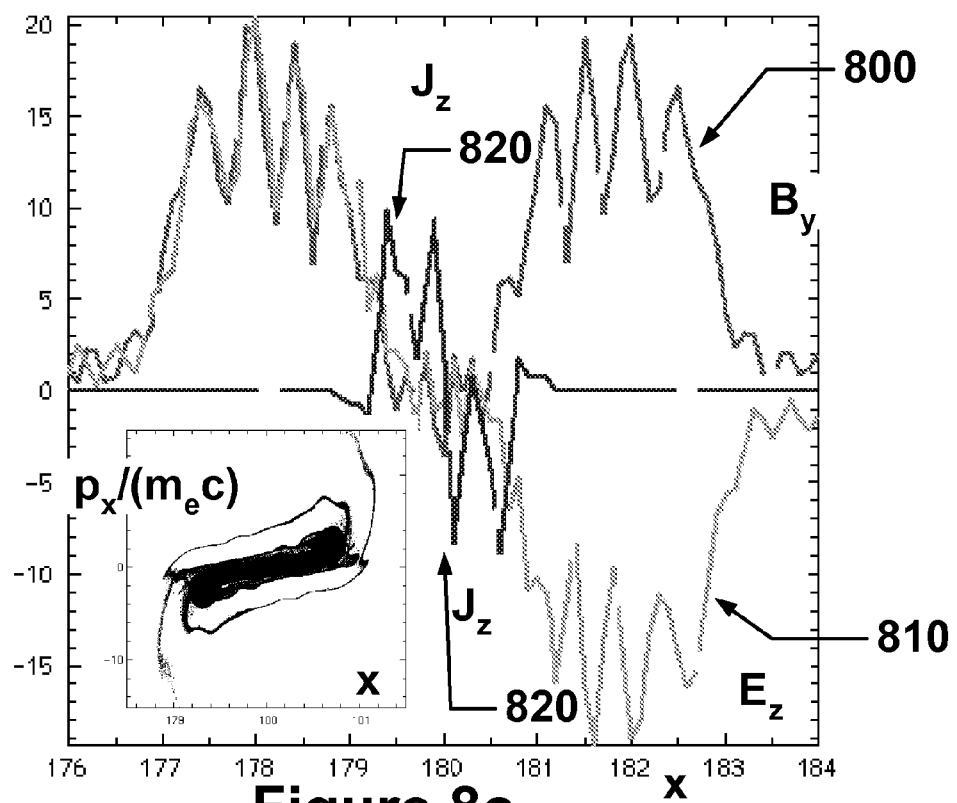
Figure 8D:
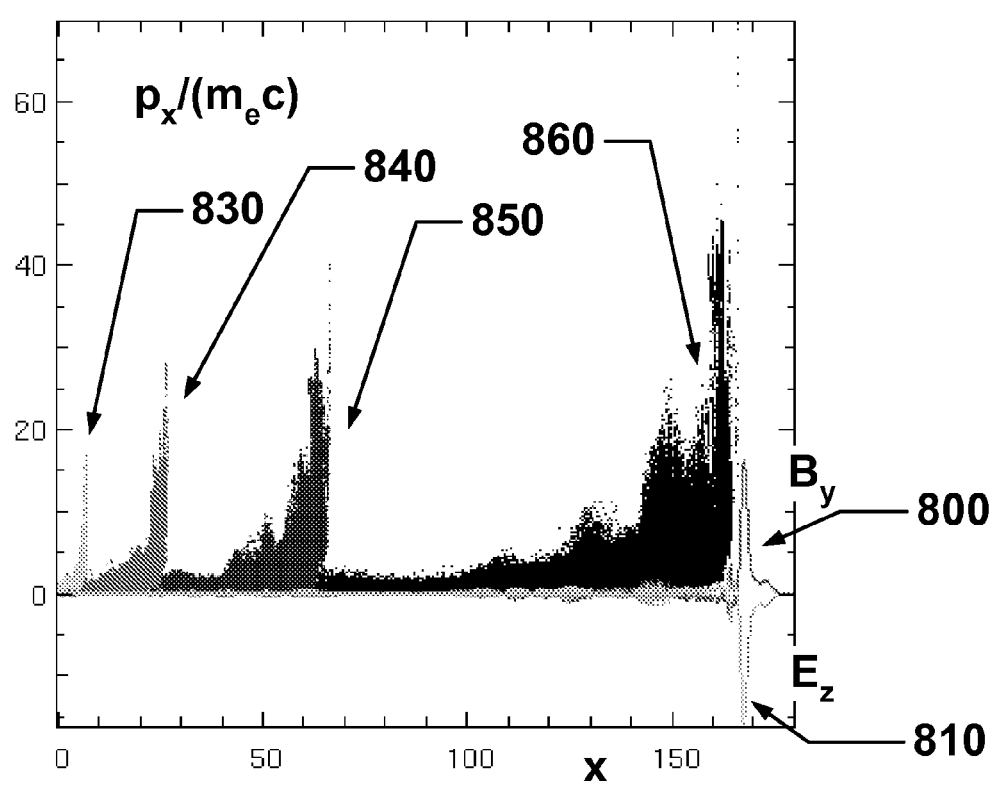
Figure 9A:
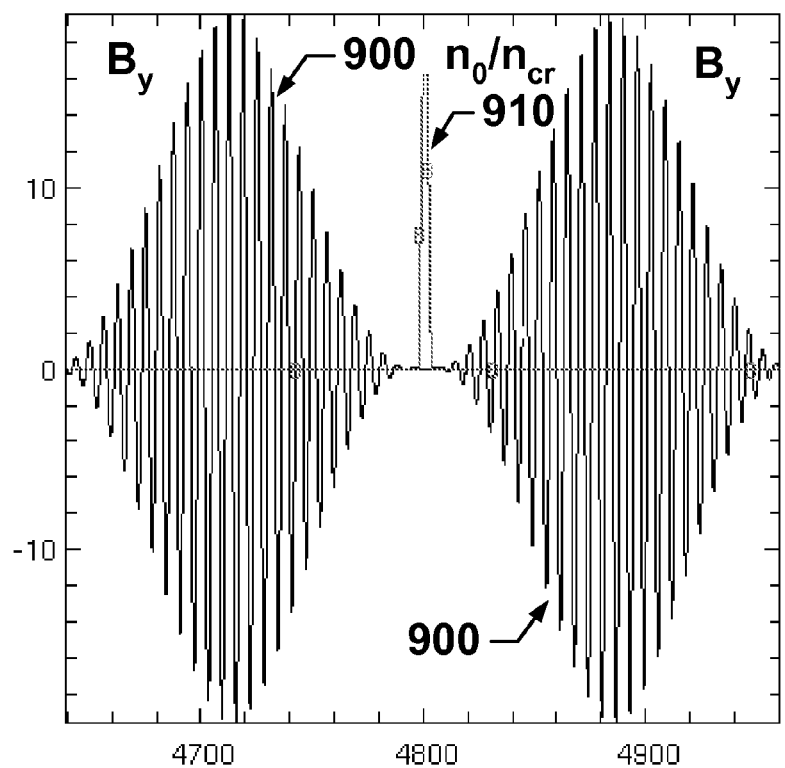
Figure 9B:
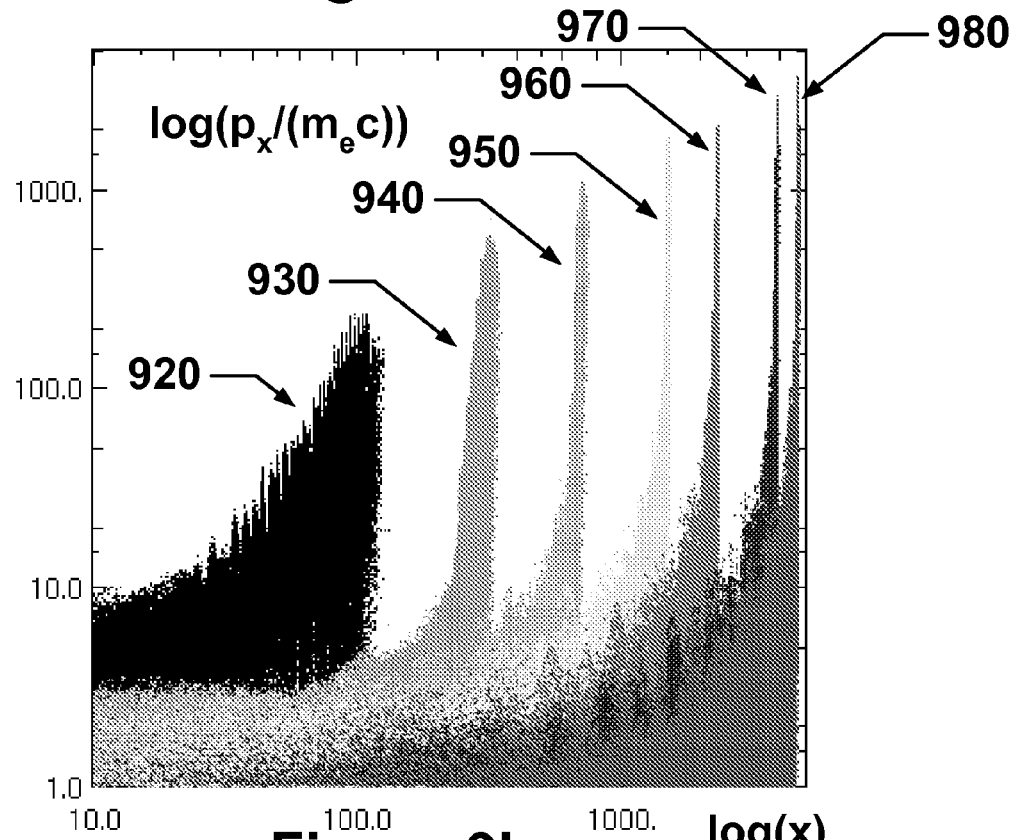
Figure 9C:
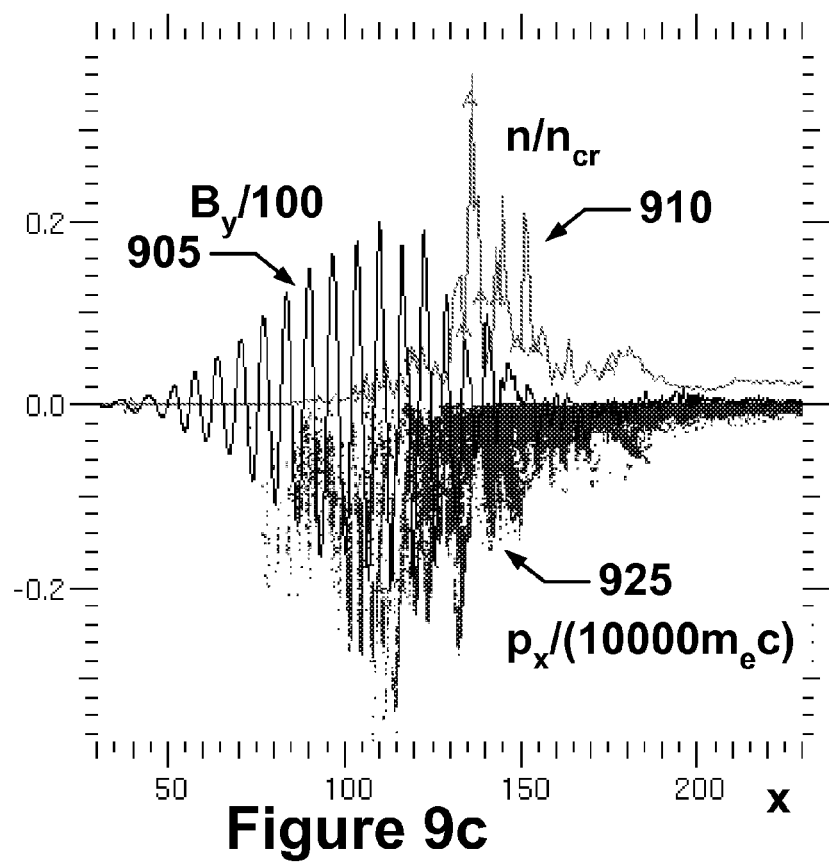
Figure 9D:
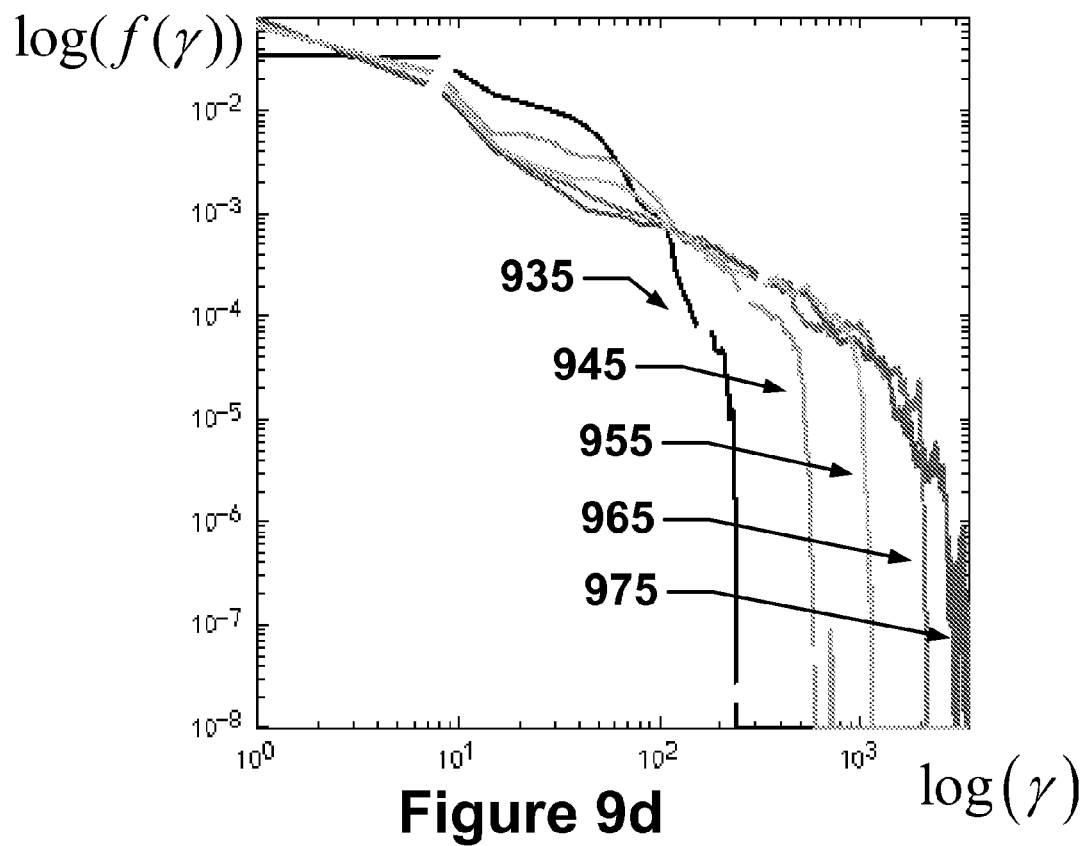
Figure 10A:
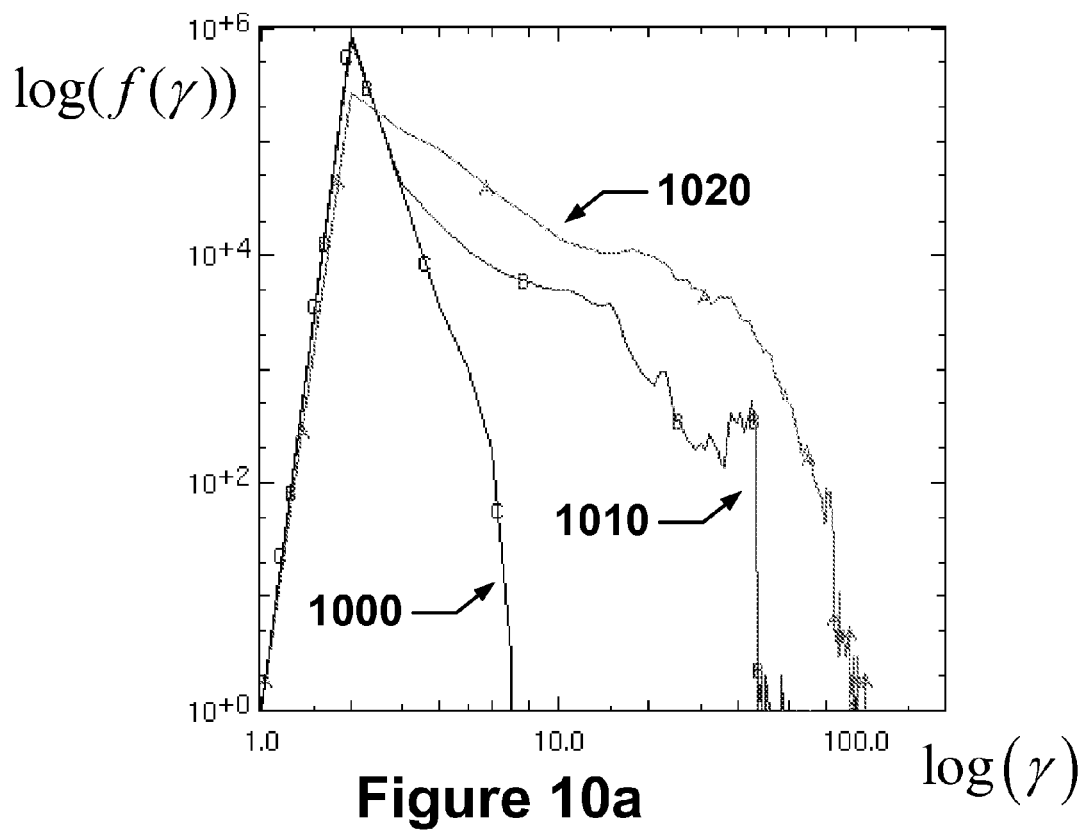
Figure 10B:
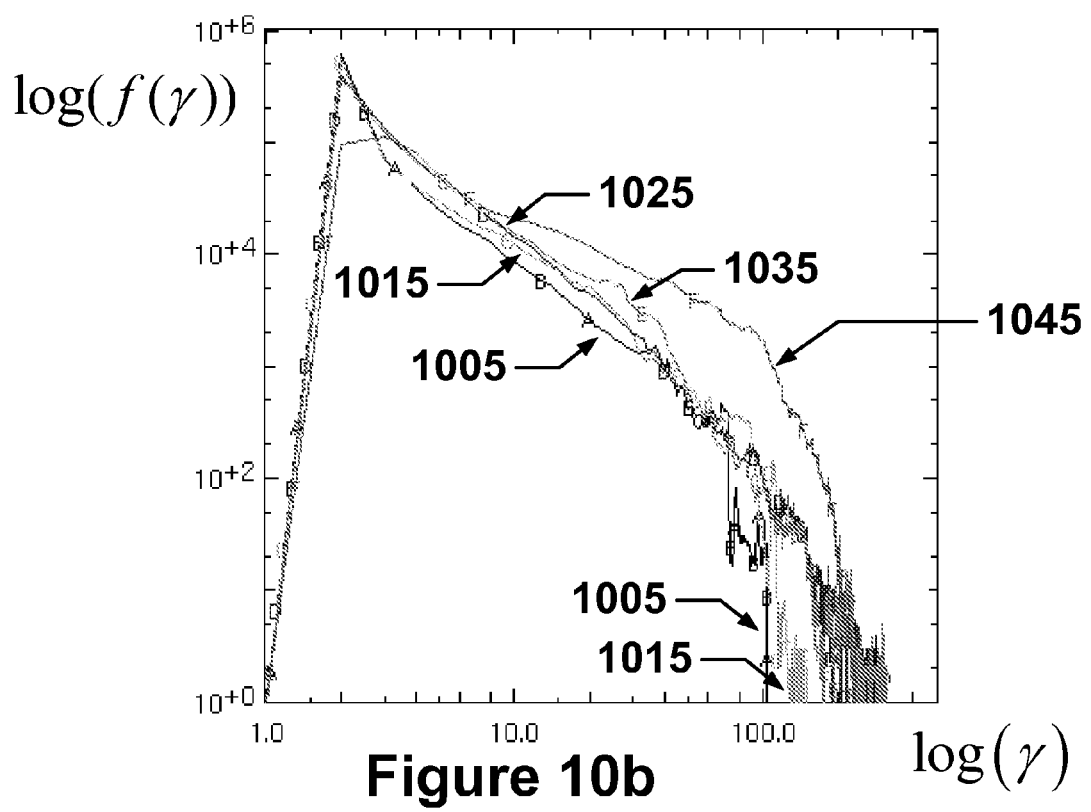
Figure 10C:
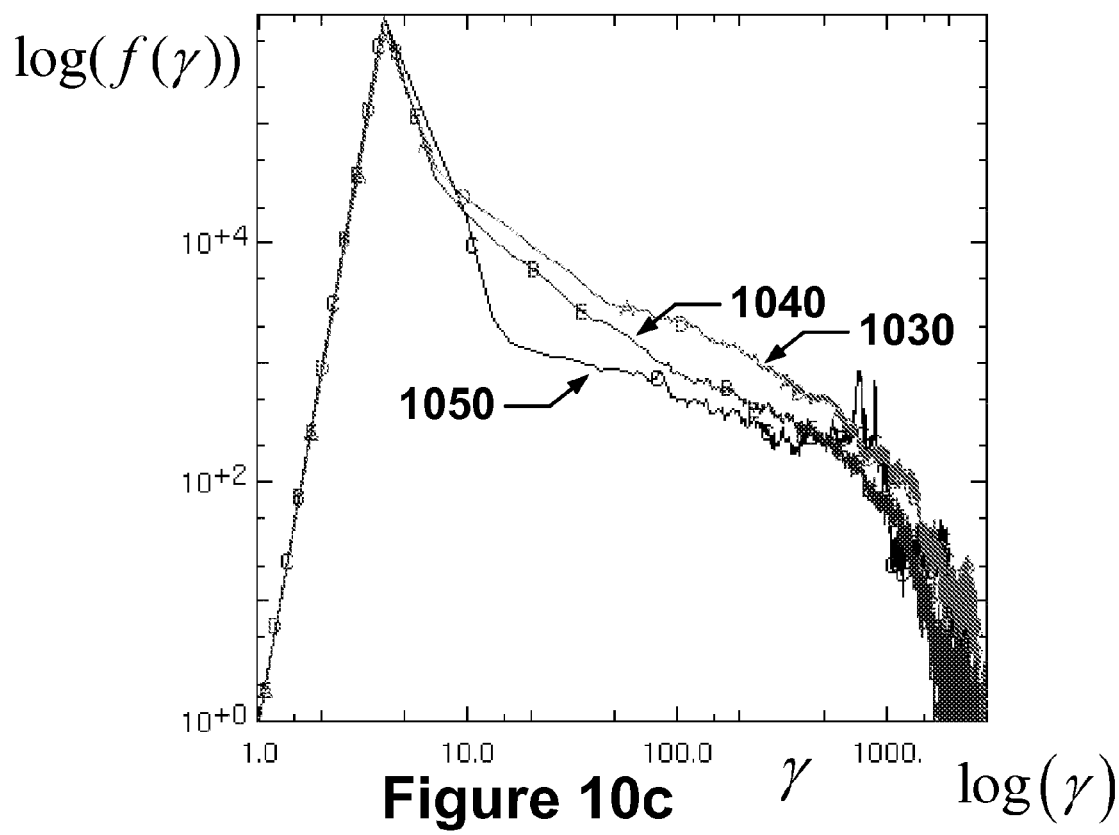
Figure 10D:
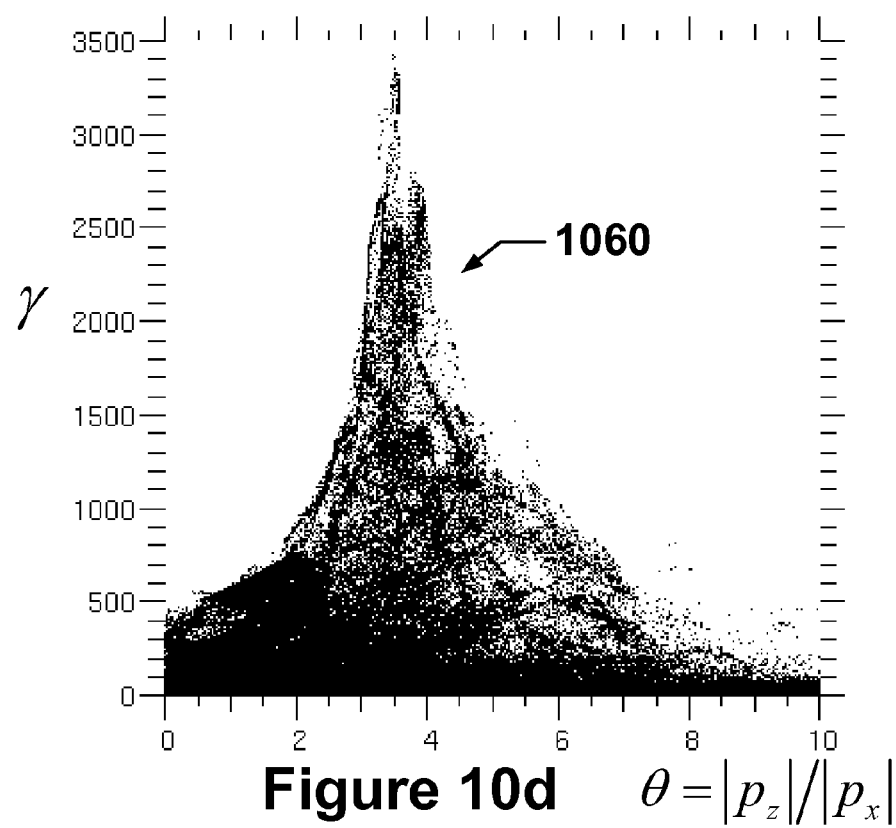

FIGS. 7a and 7b schematically illustrate a particle-in-cell (PIC) simulation, in accordance with the principles of the present invention. The simulation shows that a single ultra-intense laser (UL) pulse $(I(\lambda/\mu m)^2=10^{21}$W/cm$^2$, cτ=λ/2) snowplows an overdense ($n_o=15n_{cr}$, thickness=λ/2, kT=2.6 keV) $e^+e^-$ plasma, but cannot penetrate the overdense $e^+e^-$ plasma. The Figures show plots of magnetic field $B_y$ (700), ratio of density to critical density $n/n_{cr}$ (710), and longitudinal momentum $P_x/m_ec$ (black dots, as shown at 720) vs. x at $t\omega_o/2\pi$=5 in FIG. 7a, and at $t\omega_o/2\pi$=20 in FIG. 7b. The slab thickness is substantially greater than the relativistic skin depth at all times. The maximum Lorentz factor $\gamma_{max} \sim (\Omega_e/\omega_{pe})^2$ is equal to ~40 at late times;

FIGS. 8a, 8b, 8c, and 8d schematically illustrate the evolution of two linearly polarized plane electromagnetic (EM) pulses $(I(\lambda/\mu m)^2 = 10^{21} W/cm^2, c\tau = \lambda/2)$ irradiating an overdense $e^+e^-$ plasma $(n_o = 15 n_{cr}$, thickness=$\lambda/2$, kT=2.6 keV) from opposite sides in accordance with the principles of the present invention. The Figures show plots of magnetic field $B_y$ (800), electric field $E_z$ (810), current density $J_z$ (820), and longitudinal momentum $p_x/m_e c$ vs. x (inset) at $t\omega_o/2\pi=1.25$ in FIG. 8a, at $t\omega_o/2\pi=1.5$ in FIG. 8b, and at $t\omega_o/2\pi=1.75$ in FIG. 8c. FIG. 8d shows snapshots of the longitudinal momentum $p_x/m_e c$ vs. x for the right-moving pulse at $t\omega_o/2\pi=2.5$ (as shown at 830), at $t\omega_o/2\pi=5$ (as shown at 840), at $t\omega_o/2\pi=10$ (as shown at 850), and at $t\omega_o/2\pi=22.5$ (as shown at 860), showing power law growth of $\gamma_{max} \sim t^{0.45}$. The Figures also show the profiles of the magnetic field $B_y$ (800) and the electric field $E_z$ (810) at $t\omega_o/2\pi=22.5$;

FIGS. 9a, 9b, 9c, and 9d schematically illustrate results of two Gaussian pulse trains ($\lambda=1$ μm, I=$10^{21}$ W/cm$^2$, c$\tau$=85 fs) irradiating an $e^+e^-$ plasma ($n_o=9n_{cr}$, thickness=$2\lambda/\pi$, kT=2.6 keV), in accordance with the principles of the present invention. FIG. 9a shows early magnetic field $B_y$ and density ratio $n_o/n_{cr}$ profiles at $t\omega_o=0$, and FIG. 9b shows a plot of $\log(p_x/m_e c)$ vs. logx for the right-moving pulse at $t\omega_o=180$ (as shown at 920), at $t\omega_o=400$ (as shown at 930), at $t\omega_o=800$ (as shown at 940), at $t\omega_o=1600$ (as shown at 950), at $t\omega_o=2400$ (as shown at 960), at $t\omega_o=4000$ (as shown at 970), and at $t\omega_o=4800$ (as shown at 980), showing power-law growth of $\gamma_{max} \sim t^{0.8}$. FIG. 9c shows detailed profiles of the left-moving pulse at $t\omega_o=4800$ for $p_x/10000$ (black dots, as shown at 925), $B_y/100$ (as shown at 905), and $n/n_{cr}$ (as shown at 910) vs. x. The profiles show that the back-half of the ultra-intense laser (UL) pulse has mostly decayed, the energy having been transferred to the particles. FIG. 9d shows the evolution of the logarithm of the electron energy distribution $\log(f(\gamma))$ vs. $\log(\gamma)$, indicating the build-up of power-law behavior below $\gamma_{max}$ with slope~−1, at $t\omega_o=180$ (as shown at 935), at $t\omega_o=400$ (as shown at 945), at $t\omega_o=800$ (as shown at 955), at $t\omega_o=2400$ (as shown at 965), and at $t\omega_o=4800$ (as shown at 930), where slope=−1 means an equal number of particles per decade of energy; and FIGS. 10a, 10b, 10c, and 10d schematically illustrate a comparison of the logarithm of the electron energy distribution log $(f(\gamma))$ vs. log($\gamma$) at equal times when a single input parameter is varied, in accordance with the principles of the present invention. FIG. 10a shows the result of varying the magnitude of the vector potential for $a_o$=1.9,19, and 190 at $t\omega_o/2\pi=22.5$. FIG. 10b shows the result of varying the pulse length $\tau$ for $c\tau=\lambda/2, \lambda, 4\lambda, 7\lambda$, and $26\lambda$ at $t\omega_o/2\pi=22.5$. FIG. 10c shows the result of varying the ratio of the density to the critical density for $n_o/n_{cr}$=9, 25, and 0.001 at $t\omega_o=4800$. FIG. 10d is a plot of $\gamma$ vs. $\theta(=|P_z|/|P_x|)$ at $t\omega_o=4800$ for the UL pulses-plasma collision shown in FIGS. 9a, 9b, 9c, and 9d. The plot, indicates strong energy-angle selectivity and narrow beaming of the most energetic particles.

The patent or application file contains at least one drawing executed in color. Copies of this patent or patent application publication with color drawing(s) will be provided by the U.S. Patent and Trademark Office upon request and payment of the necessary fee.

DESCRIPTION

Accelerators and methods for the production of relativistic particles are provided. The accelerators and methods produce relativistic particles by colliding electromagnetic pulses with a thin plasma layer. The plasma layer is sufficiently thin so that the pulses penetrate and conjointly propagate through the plasma layer. The Lorenz force between induced skin currents and the magnetic field of the propagating pulses accelerates a number of "in-phase" plasma particles to relativistic velocities.

Illustrative embodiments of the present invention are described in detail below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of the present disclosure.

FIG. 6 shows the exemplary steps of a method 600 for producing relativistic particles. At step 610, in the method a plasma is produced. The plasma may, for example, be an $e^+e^-$ plasma. At step 620, the plasma is collimated to a finite thickness. Next, at step 630, at least a portion of the collimated plasma is struck substantially simultaneously with two counter-propagating ultra-intense laser (UL) electromagnetic (EM) pulses to produce relativistic particles.

FIG. 5 shows an exemplary colliding pulse accelerator (CPA) 500 based on method 600. CPA 500 includes an $e^+e^-$ plasma 530 and a collimator 540 capable of collimating the $e^+e^-$ plasma 530. In alternate embodiments of the invention, plasma 530 may be an $e^-$-ion plasma. CPA 500 may also include at least one ultra-intense laser (UL) 550 capable of producing two counter-propagating ultra-intense laser (UL) electromagnetic (EM) pulses 100 and 110, which can strike at least a portion of the collimated $e^+e^-$ plasma 530 substantially simultaneously. CPA 500 may further include a petawatt laser 560 capable of producing the $e^+e^-$ plasma 530 by striking a foil 520 with a petawatt laser pulse 510. The foil may, for example, be a gold foil, a platinum foil, and/or a foil of any other suitable high-Z material. The suitable high-Z material may have an atomic number Z, which, for example, is at least as high as the atomic number of platinum (Z=78) or gold (Z=79). In various illustrative alternative embodiments of the invention, a platinum foil is preferred.

Petawatt laser 560 may be capable of producing about a kilojoule (1 kJ) pulse lasting about a picosecond (1 ps), for about a petawatt (1 PW=$10^{15}$W) output. The output may be focused down to a spot size of about 32 microns (32 μm), resulting in an intensity I of about I=$10^{15}$W/(32 μm)$^2$=$10^{15}$W/($32\times10^{-4}$ cm)$^2$, which is equal to I=$10^{15}$W/$1024\times10^{-8}$ cm$^2$ or about I=$10^{20}$W/cm$^2$ corresponding to a value of I/c of about $3\times10^{16}$ erg/cm$^3$. This value of I/c can could produce about $10^{22}$ $e^+e^-$ pairs/cm$^3$. In comparison, the ion density of solid gold (Au) is about $6\times10^{22}$/cm$^3$.

CPA 500 also may include a converter 570 capable of converting particles accelerated by the two counter-propagating ultra-intense laser (UL) electromagnetic (EM) pulses striking at least a portion of the collimated plasma substantially simultaneously into other relativistic particles, such as muons, high-energy gamma rays (γ-rays, as described in more detail below), and the like, in ways that would be well known to those of skill in the pertinent art having the benefit of the present disclosure.

It is noted that conventional laser accelerator proposals involve underdense plasmas in which $\omega_{pe}=(4\pi ne^2/m_e)^{1/2} < \omega_o=2\pi c/\lambda$, where $\lambda$=laser wavelength, $m_e$ is the rest mass of an electron $e^-$ or of a positron $e^+$, e is the absolute value of the electric charge of an electron $e^-$ or of a positron $e^+$, c is the speed of light in a vacuum, and n=electron density). In contrast, the inventive accelerators and methods involve overdense $e^+e^-$ pairs. A new robust mechanism for sustained in-phase acceleration of relativistic overdense $e^+e^-$ pairs with ultra-intense lasers (ULs) is exploited.

Particle-in-cell (PIC) simulations of the mechansim for sustained acceleration of electron-positron ($e^+e^-$) plasmas by comoving electromagnetic (EM) pulses have been carried out. When a thin slab of an overdense $e^+e^-$ plasma is irradiated with ultra-intense short laser pulses from both sides, the laser pulses are transmitted when the plasma is compressed to a thickness thinner than about 2 skin depths. A fraction of the plasma is captured and continuously accelerated by the transmitted laser pulses, which are slowed by plasma loading, reaching energies exceeding the ponderomotive limit. For a 1 µm laser and $10^{21}$Wcm$^{-2}$ intensity, the maximum energy exceeds about a GeV in a picosecond. A thin slab of a plasma may be defined, for example, to be a slab of the plasma no thicker than about a wavelength $\lambda$ of the ultra-intense laser (UL), but usually thicker than about a plasma skin depth. Thus, for a 1 µm laser, a thin slab of plasma may have a thickness in a range of about 0.5 µm to about 1 µm.

An overdense plasma may be defined, for example, by the condition $\omega_{pe}=(4\pi ne^2/m_e)^{1/2} \geqq \omega_o=2\pi c/\lambda$, where $\lambda$=laser wavelength, $m_e$ is the rest mass of an electron $e^-$ or a positron $e^+$, e is the absolute value of the electric charge of an electron $e^-$ or a positron $e^+$, c is the speed of light in a vacuum, and n=electron density. Further, a critically dense plasma may be defined, for example, by the condition $\omega_{pe}=(4\pi ne^2/m_e)^{1/2}=\omega_o=2\pi c/\lambda$, where $\lambda$=laser wavelength, $m_e$ is the rest mass of an electron $e^-$ or a positron $e^+$, e is the absolute value of the electric charge of an electron $e^-$ or a positron $e^+$, c is the speed of light in a vacuum, and n=the critical electron density=$n_{cr}$.

The simulations utilized a 2-½-D particle-in-cell (PIC) code ZOHAR. (See e.g., C. K. Birdsall, A. B. Langdon, *Plasma Phys. Via Computer Simulation* (IOP, Bristol, UK, 1991) and A. B. Langdon, B. F. Lasinski, *Methods in Computation Phys.*, J. Killeen et al. Eds. (Academic, NY, 1976), Vol. 16, p. 327). The simulations demonstrate that striking a central $e^+e^-$ plasma 530 simultaneously with two counter-propagating ultra-intense laser (UL) electromagnetic (EM) pulses 100 and 110 can lead to continuous acceleration of at least some of the $e^+e^-$ pairs to ultra-high relativistic energies. Light pressure from two sides first compresses the slab of the central $e^+e^-$ plasma 530 until the slab becomes so thin that ultra-intense laser (UL) electromagnetic (EM) pulses 100 and 110 are transmitted through $e^+e^-$ plasma 530. As the electromagnetic (EM) waves pass through $e^+e^-$ plasma 530, the electromagnetic (EM) waves accelerate and trap a fraction of the $e^+e^-$ pairs.

Induced drift currents then slow the electromagnetic (EM) waves so that the electromagnetic (EM) waves get in phase with the fastest $e^+e^-$ particles. During the reexpansion of the central $e^+e^-$ plasma 530, the slower $e^+e^-$ particles gradually fall behind the ultra-intense laser (UL) electromagnetic (EM) pulses 100 and 110, but the fastest $e^+e^-$ particles stay in-phase indefinitely helped by the ponderomotive traps formed by the drift currents. Both the ultra-intense laser (UL) electromagnetic (EM) pulses 100 and 110 and the decreasing number of fast $e^+e^-$ particles become increasingly relativistic with time.

The inventive colliding pulse accelerators differ in at least two major ways from a conventional laser ponderomotive accelerator in which a single ultra-intense laser pulse strikes a plasma surface. (See e.g., S. C. Wilks, W. L. Kruer, M. Tabak, A. B. Langdon, *Phys. Rev. Lett.* 69, 1383 (1992)). First, in conventional laser ponderomotive heating, the accelerated particle usually gets one pass in the electromagnetic (EM) field, whereas in the inventive colliding pulse accelerators (e.g., CPA 500), the fastest $e^+e^-$ particles stay in-phase indefinitely with the electromagnetic (EM) field. Second, when the ultra-intense laser (UL) light pressure in conventional laser ponderomotive heating snowplows a plasma, all upstream particles share the momentum of the Poynting flux, whereas in the inventive colliding pulse accelerators (e.g., CPA 500) the main ultra-intense laser (UL) electromagnetic (EM) pulses 100 and 110 continually shed slower $e^+e^-$ particles and focus the pulse energy on a decreasing number of fast $e^+e^-$ particles. In CPA 500, for example, for a laser wavelength $\lambda$=1 µm and an ultra-intense laser (UL) intensity I=$10^{21}$W/cm$^2$, the Lorentz relativistic gamma factor y may reach several thousands in less than a picosecond (ps). In contrast, in conventional laser ponderomotive heating, the Lorentz relativistic gamma factor $\gamma \sim \Omega_e/\omega o$ is equal to~30 (where $\Omega_e$=eB/$m_e$c is equal to the electron gyrofrequency in the laser magnetic field B, $m_e$ is the rest mass of an electron $e^-$ or a positron $e^+$, e is the absolute value of the electric charge of an electron $e^-$ or of a positron $e^+$, c is the speed of light in a vacuum, and coo is equal to the laser frequency). (See e.g., W. L. Kruer, K. G. Estabrook, *Phys. Fluids* 28, 430 (1985) and S. C. Wilks, W. L. Kruer, M. Tabak, A. B. Langdon, *Phys. Rev. Lett.* 69, 1383 (1992)).

The principles of physics underlying the inventive colliding pulse accelerator CPA 500 may be similar to those of a Diamagnetic Relativistic Pulse Accelerator (DRPA), which is described, for example, by E. Liang, K. Nishimura, H. Li, S. P. Gary, *Phys. Rev. Lett.* 90, 085001 (2003), E. Liang, K. Nishimura, *Phys. Rev. Lett.* 92, 175005 (2004), and K. Nishimura, E. Liang, *Phys. Plasmas* 11 (10) (2004). However, it is noted that the Diamagnetic Relativistic Pulse Accelerator (DRPA) is conceptually launched by the sudden deconfinement of a strongly magnetized plasma, which can be very difficult to realize experimentally. In contrast, the inventive colliding pulse accelerators (e.g., CPA 500) utilize realized ultra-intense laser (UL) technology.

The operation of CPA 500 can be understood with reference to FIGS. 1a-1j and FIG. 5. In CPA 500 (FIG. 5), two linearly polarized plane electromagnetic (EM) pulses 100 and 110 are normally incident on a central $e^+e^-$ plasma slab 530. Alternatively, pulses 100 and 110 may be circularly polarized. FIGS. 1a-1g show the simulated evolution of electromagnetic (EM) fields 120 and 130, and current density 140. Further, FIGS. 1f-1j show phase plots.

For the simulations shown, the electromagnetic (EM) pulses 100 and 110 are idealized as half-cycle sine waves. FIGS. 1a-1j show time-lapse snapshots of two ultra-intense laser (UL) electromagnetic (EM) pulses 100 and 110 colliding normally with $e^+e^-$ plasma 530 centered at x=180, when $t\omega_o/2\pi$=1 (FIGS. 1a and 1f), $t\omega_o/2\pi$=1.25 (FIGS. 1b and 1g), $t\omega_o/2\pi$=1.5 (FIGS. 1c and 1h), $t\omega_o/2\pi$=1.75 (FIGS. 1d and 1i), and $t\omega_o/2\pi$=22.5 (FIGS. 1e and 1j).

As seen from FIG. 1a, the two ultra-intense laser (UL) electromagnetic (EM) pulses 100 and 110 strike the initial $e^+e^-$ plasma 530 when $t\omega_o$=$2\pi$, where $\omega_o$ is equal to the laser frequency. The initial density of the $e^+e^-$ plasma 530 is n=15$n_{cr}$, where $n_{cr}$ is the critical density at which the electron positron $e^+e^-$ plasma 530 frequency $\omega_{pe}=(4\pi ne^2/m_e)^{1/2}$ is equal to the ultra-intense laser (UL) frequency $\omega_o$, the initial thermal energy of the $e^+e^-$ plasma 530 is kT=2.6 keV, the initial $e^+e^-$ plasma 530 thickness is equal to 0.5 µm, the ultra-intense laser (UL) wavelength is $\lambda$=1 µm, and the ultra-intense laser (UL) intensity is I=$10^{21}$W/cm$^2$. FIGS. 1a-1e show snapshots of the ultra-intense laser (UL) magnetic field B 120, the ultra-intense laser (UL) electric field E 130, and the current density J 140. FIGS. 1*f*-1*j* show respective snapshots of phase plots of $p_x/m_ec$ vs. x, where $p_x$ is the component of the $e^+e^-$ particle momentum p in the x direction.

As seen in FIGS. 1*b* and 1*g*, the incident ultra-intense laser (UL) electromagnetic (EM) pulses 100 and 110 first steepen, compress and accelerate the $e^+e^-$ plasma 530 inward, Only a small fraction of the ultra-intense laser (UL) electromagnetic (EM) pulses 100 and 110 is reflected. With time the $e^+e^-$ plasma 530 becomes thin. FIGS. 1*c* and 1*h*, show skin currents that are much wider than $c/\omega_{pe}$ due to relativistic effects, as described by P. Kaw, J. Dawson, *Phys. Fluids* 13, 472 (1970). After the $e^+e^-$ plasma 530 becomes so thin that the induced skin currents from both sides start to merge, the ultra-intense laser (UL) electromagnetic (EM) pulses 100 and 110 are transmitted through the $e^+e^-$ plasma 530, as seen in FIGS. 1*d* and 1*i*, even though formally the $e^+e^-$ plasma 530 density $n \gg n_{cr}$ (where $n_{cr}$ is the critical density at which $\omega_{pe}=\omega_o$). Such transmission of ultra-intense laser (UL) electromagnetic (EM) waves through the overdense $e^+e^-$ plasma 530 can not occur with only single-sided irradiation since the light pressure would simply snowplow the upstream $e^+e^-$ plasma 530 indefinitely.

As the ultra-intense laser (UL) electromagnetic (EM) waves 100 and 110 pass through the $e^+e^-$ plasma 530, the J×B forces at first reflect and decelerate the counter-streaming $e^+e^-$ particles, creating the complex phase pattern shown in FIG. 1*h*. After the ultra-intense laser (UL) electromagnetic (EM) pulses 100 and 110 move ahead of the drift currents the J×B forces reaccelerate the particles as shown in FIGS. 1*d* and 1*i*, respectively. In other words, during compression, the current density J 140 sits at the leading edge of the ultra-intense laser (UL) electromagnetic (EM) pulses 100 and 110 to prevent the ultra-intense laser (UL) electromagnetic (EM) pulses 100 and 110 from entering the $e^+e^-$ plasma 530, while during reexpansion, the current density J 140 sits at the trailing edge of the ultra-intense laser (UL) electromagnetic (EM) pulses 100 and 110 to prevent the ultra-intense laser (UL) electromagnetic (EM) pulses 100 and 110 from leaving the $e^+e^-$ plasma 530.

The change of the current density J 140 location causes the J×B force to switch from "pushing" to "pulling." Since the current density J 140 also slows the ultra-intense laser (UL) electromagnetic (EM) pulses 100 and 110, the fastest $e^+e^-$ particles manage to stay in-phase. As the ultra-intense laser (UL) electromagnetic (EM) pulses 100 and 110 propagate, slower e-e- particles gradually fall behind, and a decreasing number of remaining fast $e^+e^-$ particles get most of the energy transfer from the ultra-intense laser (UL) electromagnetic (EM) pulses 100 and 110. This makes the remaining fast $e^+e^-$ particles increasingly relativistic with time, as shown, for example, in FIG. 1*j*. It is noted that that the reflected wave amplitude is only~10% of the transmitted amplitude, as shown, for example, in FIG. 1*d*.

FIG. 2 shows the evolution of the particle energy distribution including the formation of a power-law, with the maximum Lorentz relativistic gamma factor $\gamma_{max}$ increasing with time. This formation of a power law is similar to that in DRPA, as described, for example, in, E. Liang, K. Nishimura, *Phys. Rev. Lett.* 92, 175005 (2004). FIG. 2, in particular, shows an evolution of the logarithm of the electron energy distribution $f(\gamma)$, $\log(f(\gamma))$, vs. the logarithm of $\gamma$, $\log(\gamma)$, (where $\gamma$ is the Lorentz relativistic gamma factor) for the simulated pulse-plasma collision shown in FIGS. 1*a*-1*j*. The curves in FIG. 2 exhibit power-law behavior with slope~–2 at late-times, where $t\omega_o/2\pi=0$ (as shown at 200), $t\omega_o/2\pi=1$ (as shown at 210), $t\omega_o/2\pi=1.5$ (as shown at 220), $t\omega_o/2\pi=10$ (as shown at 230), and $t\omega_o/2\pi=22.5$ (as shown at 240), respectively.

In all of the simulations performed, the maximum energy increases with time according to $c\int eE(t)dt$ where E(t) is the comoving electric field E, as a function of time. However, in practice, the acceleration may be limited by the transverse size R of the ultra-intense laser (UL) beam, since a particle drifts transversely out of the laser beam after t~R/c. For sufficiently low $e^+e^-$ pair densities and long ultra-intense laser (UL) electromagnetic (EM) pulses 100 and 110, the maximum energy may be ultimately limited by eER~6GeV $(I/10^{21}Wcm^{-2})^{1/2}$(R/100 μm), where E is the magnitude of the electric field E, and I is the intensity, of the ultra-intense laser (UL) electromagnetic (EM) pulses 100 and 110. Yet, it is noted, that this maximum energy attainable in the inventive accelerators corresponds to about $10^4$ x more energy gain per distance than is possible with current conventional particle accelerators, which have an energy gain per distance of at most about 1 GeV/m.

FIGS. 3*a* and 3*b* show simulation results for two Gaussian ultra-intense laser (UL) electromagnetic (EM) pulse trains 300, 310 striking an $e^+e^-$ plasma 530 centered at x=2400. For the simulations, the initial $e^+e^-$ plasma 530 thickness was equal to 0.5 μm, the initial density of the $e^+e^-$ plasma was $n=9n_{cr}$, or about $n=9.9\times10^{21}cm^{-3}$, the initial thermal energy of the $e^+e^-$ plasma was kT=2.6 keV, the ultra-intense laser (UL) wavelength λ=1 μm, the gaussian pulse length was equal to 85 femtoseconds (fs), and the ultra-intense laser (UL) intensity was $I=10^{21}Wcm^{-2}$. The simulations show that the maximum Lorentz relativistic gamma factor $\gamma_{max}$ reaches 2500 at 1.28 ps after the ultra-intense laser (UL) electromagnetic (EM) pulses 300, 310 strike the $e^+e^-$ plasma 530 surface. FIG. 3*a* shows an initial profile of the ultra-intense laser (UL) electromagnetic (EM) pulses 300, 310. FIG. 3*b* shows phase plots at $t\omega_o=20$ (as shown at 320), $t\omega_o=820$ (as shown at 330), $t\omega_o=1620$ (as shown at 340), and $t\omega_o=2420$ (as shown at 350) after the ultra-intense laser (UL) electromagnetic (EM) pulses 300, 310 strike the $e^+e^-$ plasma 530. The phase plots show the increase of the maximum Lorentz relativistic gamma factor $\gamma_{max}$ with time. The maximum energy reaches 11.3 GeV at a distance of only 385 μm.

In practice, it may be difficult to deliver substantially identical ultra-intense laser (UL) intensities on both sides of plasma 530. Simulations were carried out to investigate the behavior of CPA 500 in such practical circumstances. FIGS. 4*a* and 4*b* show the simulation results for irradiating the target of FIGS. 3*a* and 3*b* with ultra-intense laser (UL) electromagnetic (EM) pulses of unequal intensities. In particular, the $e^+e^-$ plasma targets for FIGS. 4*a* and 4*b* are the same (except for the initial densities of the respective $e^+e^-$ plasmas) as the $e^+e^-$ plasma target for FIGS. 3*a* and 3*b*, where the initial $e^+e^-$ plasma thickness is equal to 0.5 μm, the initial thermal energy of the $e^+e^-$ plasma is kT=2.6 keV, the ultra-intense laser (UL) wavelength λ=1 μm, and the gaussian pulse length is equal to 85 femtoseconds (fs). FIGS. 4*a* and 4*b* show phase plots at $t\omega_o/2\pi=22.5$ of two unequal ultra-intense laser (UL) electromagnetic (EM) pulses striking an $e^+e^-$ plasma centered at x=180.

FIG. 4*a* shows the result of irradiating the $e^+e^-$ plasma target, having an initial density of the $e^+e^-$ plasma $n=0.04\ n_{cr}$, with ultra-intense laser (UL) electromagnetic (EM) pulses of unequal intensities: an ultra-intense laser (UL) intensity $10^{21}Wcm^{-2}$ propagating to the right and an ultra-intense laser (UL) intensity $8\times10^{20}Wcm^{-2}$ propagating to the left. Remarkably, most of the accelerated $e^+e^-$ particles are accelerated by the right-moving more intense pulse, and the left-moving less intense pulse decouples early from the plasma with little $e^+e^-$ particle acceleration.

FIG. 4b shows the result of the same unequal ultra-intense laser (UL) electromagnetic (EM) pulses as shown in FIG. 4a irradiating a much denser $e^+e^-$ plasma target slab, having an initial density of the $e^+e^-$ plasma $n=25\,n_{cr}$, (or approximately $n=2.75 \times 10^{22}/cm^3$, for an $e^+e^-$ plasma target slab 0.5 μm thick). In this case, both pulses accelerate particles at lower efficiency. These examples underscore the robustness of particle acceleration mechanism underlying the inventive colliding pulse accelerators.

The simulations described above focus on the basic physics of the colliding pulse accelerator (CPA) mechanism. Further simulations may relax simplifying assumptions such as uniform plane waves and normal incidence. 2- and 3-D codes may be used to study the effects of finite laser cross-section, beam divergence, wave-front and plasma non-uniformities, particle escape and other issues relevant to practical implementations of the colliding pulse accelerators.

With renewed reference to FIGS. 5 and 6, it is noted that in CPA 500, petawatt (PW) laser 560 can hit a gold foil 520 to produce an $e^+e^-$ plasma 530 jet, as demonstrated, for example, in the experiment described by T. E. Cowan et al., *Laser Part. Beams* 17, 773 (1999). This $e^+e^-$ plasma 530 jet (having a density of about $n \sim 10^{18}$-$10^{19} cm^{-3}$) can be then passed through a narrow slit collimator 540 to produce about a ~2 μm thick $e^+e^-$ plasma 530 slab, which is immediately irradiated from both sides by ultra-intense laser (UL) electromagnetic (EM) pulses 100 and 110. As an example, consider ultra-intense laser (UL) electromagnetic (EM) pulses 100 and 110 with an equivalent length of about 30 femtoseconds (fs) and an average intensity of about $10^{19}$ Wcm$^{-2}$. To constrain the $e^+e^-$ pairs to remain inside the beam while moving transversely at about +/−c for about~1 picosecond (ps) (e.g., as shown in FIGS. 3a and 3b), a ultra-intense laser (UL) 550 beam size of about R>600 μm may be needed. This beam size need corresponds to about 1 kilojoule (kJ) of energy per ultra-intense laser (UL) pulse. Such high-energy ultra-intense lasers (ULs) are currently being developed at many sites worldwide, as described in the *SAUUL Report*, T. Ditmire, Ed. (UT Austin, 2003). Thus it is likely that practical implementations of inventive colliding pulse accelerator (CPA) 500 and method 600 can be achieved expeditiously.

It is further noted that petawatt (PW) laser 560, which may be used to produce the $e^+e^-$ plasma 530 jet, can be a medium-energy laser, since only a small number of $e^+e^-$ pairs is required for relativistic particle production. Scaling from the results described by T. E. Cowan et al., *Laser Part. Beams* 17, 773 (1999), for example, a 50 femtosecond (fs), 50 J petawatt (PW) laser 560 can produce about~$10^{10}$ $e^+e^-$ pairs with a jet length of about~15 μm, which should suffice for many applications.

In practical implementations of the invention, suitable diagnostic techniques may be used to characterize particles. For measurements of the spectrum and density profile of the accelerated $e^+e^-$ pairs detecting D-rays produced by Compton scattering, as described by G. B. Rybicki, A. P. Lightman, *Radiation Processes in Astrophys.* (Wiley, NY, 1979) may provide the cleanest diagnostics. At a maximum Lorentz relativistic gamma factor of about $\gamma_{max} \sim 3000$, Compton backscattering converts a 1 eV infrared (IR) photon into a 10 MeV γ-ray as described, for example, by G. B. Rybicki, A. P. Lightman, *Radiation Processes in Astrophys.* (Wiley, N.Y., 1979). Therefore shining a pulsed infrared (IR) probe laser into the accelerated $e^+e^-$ pairs and measuring the backscattered γ-ray spectrum and intensity as functions of the backscattered γ-ray arrival time, can provide snapshots of the $e^+e^-$ phase distribution.

In addition to producing relativistic particles, the inventive CPA 500 and method 600 can be used for conversion of infrared (IR) laser energy into high-energy γ-rays. The laser energy may be extracted as γ-rays via Compton scattering of infrared (IR) photons, as described above. For example, a 1 GeV electron may Compton backscatter a 1 eV infrared (IR) photon into a 4 MeV γ-ray. The resulting high-energy γ-ray beam will be narrowly focused in the forward direction due to relativistic effects.

The intense γ-rays extracted via Compton scattering of infrared (IR) photons may be suitable for a wide range of applications, including medical irradiation applications, medical imaging applications, and material science imaging applications. It is expected that the intensity of the intense γ-rays extracted via Compton scattering of infrared (IR) photons and the energy conversion efficiency in CPA 500 will be much higher than for conventional high-energy gamma-ray (γ-ray) beams produced by large conventional particle accelerators. Further, as ultra-intense lasers (ULs) become smaller in size (e.g., tabletop size, rather than room sized), small, portable γ-ray sources may be made available based on the inventive CPA 500 and method 600. The intense γ-rays generation may be studied using particle-in-cell (PIC) code coupled to Monte Carlo photon transport.

The $e^+e^-$ plasmas, which show high mobility and efficient acceleration, have been used as convenient examples herein to describe the operation of CPA 500 and method 600. However, it will be understood that the invention is not limited to such plasmas. For example, low-density electron-ion ($e^-$-ion) plasmas may be subject to 2-sided ultra-intense laser (UL) irradiation for relativistic particle production in accordance with the principles of the invention. The low-density electron-ion ($e^-$-ion) plasmas may, for example be made with gas jets and/or aerogels. At sufficiently low densities charge separation electric fields, as described, for example, by K. Nishimura, E. Liang, S. P. Gary, *Phys. Plasmas* 10, 4559 (2003), between the electrons and ions may become too weak to prevent the 2-sided ultra-intense laser (UL) pulses from accelerating the electrons. Therefore, colliding pulse accelerator (CPA) 500 and method 600 may be operated with electron-ion ($e^-$-ion) plasmas for the production of relativistic particles and high intensity γ-rays though perhaps at a lower efficiency.

Further, particle-in-cell (PIC) simulations of the comoving acceleration of overdense ($\omega_{pe} > \omega_o$) plasmas by colliding UL pulses have been carried out. In this case the acceleration gradient and particle beam intensity are not limited by the underdensity condition, as described above. This colliding pulses accelerator (CPA) mechanism may have additional important applications complementary to those of underdense laser acceleration schemes.

For example, consider an intense electromagnetic (EM) pulse with $\Omega_e (=a_o \omega_o = eB_o/m_e c$, $a_o =$the magnitude of the normalized vector potential$)> \omega_{pe}$ initially imbedded inside an overdense plasma ($\omega_{pe} >> \omega_o$). When the intense electromagnetic (EM) pulse tries to escape, the intense electromagnetic (EM) pulse induces a diamagnetic skin current J that inhibits the electromagnetic (EM) field from leaving. The resultant J×B (ponderomotive) force then accelerates the surface plasma to follow the electromagnetic (EM) pulse. As the electromagnetic (EM) pulse "pulls" the surface plasma, the electromagnetic (EM) pulse is slowed by plasma loading (group velocity <c), allowing the fastest particles to comove with the electromagnetic (EM) field. But, since slower particles eventually fall behind, the plasma loading decreases and the electromagnetic (EM) pulse accelerates with time. A dwindling number of fast particles also get accelerated indefinitely by the comoving electromagnetic (EM) force, reaching maximum Lorentz factors $\gamma_{max} > a_o^2/2 >> (\Omega_e/\omega_{pe})^2$, as described, for example, by L. D. Landau, E. M. Lifshitz, *Classical Theory of Fields* (Pergamon, London 1975), T. Boyd, J. Sanderson, *Plasma Dynamics* (Barnes and Noble, NY 1969), and F. V. Hartmann and A. K. Kerman, *Phys. Rev. Lett.* 76, 624 (1996). This phenomenon is called the diamagnetic relativistic pulse accelerator (DRPA) mechanism, as described, for example, by E. Liang, K. Nishimura, H. Li, S. P. Gary, Phys. Rev. Lett. 90, 085001 (2003), E. Liang, K. Nishimura, *Phys. Rev. Lett.* 92, 175005 (2004), and K. Nishimura, E. Liang, *Phys. Plasmas* 11 (10) (2004). The diamagnetic relativistic pulse accelerator (DRPA) is strictly a nonlinear, collective, relativistic phenomenon, with no analog in the weak field ($\Omega_e/\omega_{pe} < 1$), low density ($\omega_o > \omega_{pe}$), and/or test particle limit.

Since the discovery of the diamagnetic relativistic pulse accelerator (DRPA) mechanism from particle-in-cell (PIC) simulations, a key question has been how to make adiamagnetic relativistic pulse accelerator (DRPA) in the laboratory, as vacuum electromagnetic (EM) waves cannot penetrate an overdense plasma beyond the relativistic skin depth, as described, for example, by P. Kaw, J. Dawson, *Phys. Fluids* 13, 472 (1970). FIGS. 7a and 7b schematically illustrate a particle-in-cell (PIC) simulation that shows that a single ultra-intense laser (UL) pulse ($I(\lambda/\mu m)^2 = 10^{21} W/cm^2$, $c\tau = \lambda/2$) snowplows, but cannot penetrate, an overdense ($n_o = 15 n_{cr}$, thickness $= \lambda/2$, kT=2.6keV) $e^+e^-$ plasma. The Figures show plots of the magnetic field By (700), ratio of density to critical density $n/n_{cr}$ (710), and longitudinal momentum $p_x/m_e c$ (black dots, as shown at 720) vs. x at $t\omega_o/2\pi = 5$ (FIG. 7a) and at $t\omega_o/2\pi = 20$ (FIG. 7b). The slab thickness is substantially greater than the relativistic skin depth at all times. The maximum Lorentz factor $\gamma_{max} \sim (\Omega_e/\omega_{pe})^2 \sim 40$ at late times.

FIGS. 7a and 7b show that all of the upstream $e^+e^-$ plasma is snowplowed by the ultra-intense laser (UL), and the terminal maximum Lorentz factor $\gamma_{max} \sim (\Omega_e/\omega_{pe})^2$. The relativistic mass increase described, for example, by P. Kaw, J. Dawson, *Phys. Fluids* 13, 472 (1970), is countered by density compression, and the $e^+e^-$ plasma stays overdense and prevents the ultra-intense laser (UL) from penetrating. This confirms that the diamagnetic relativistic pulse accelerator (DRPA) initial condition cannot be achieved using a single ultra-intense laser (UL) pulse.

In contrast, the present particle-in-cell (PIC) simulations with the 2.5D (2D-space, 3 momenta) ZOHAR code, as described by A. B. Langdon, B. F. Lasinski, *Methods in Computation Phys.*, J. Killeen et al. Eds. (Academic, NY, 1976), Vol. 16, p. 327, and C. K.Birdsall, A. B. Langdon, *Plasma Phys. Via Computer Simulation* (IOP, Bristol, UK, 1991) demonstrate that DRPA-like sustained comoving acceleration can be achieved by irradiating a thin slab of overdense $e^+e^-$ plasma with ultra-intense laser (UL) pulses from opposite sides. The opposing ultra-intense laser (UL) pulses first compress the overdense $e^+e^-$ plasma to a total thickness <2 relativistic skin depths, as described by P. Kaw, J. Dawson, *Phys. Fluids* 13, 472 (1970). At the compressed thickness the ultra-intense laser (UL) pulses "tunnel" through the overdense $e^+e^-$ plasma, despite the overdensity of the overdense $e^+e^-$ plasma, even allowing for relativistic effects ($\omega_{pe} > <\gamma> \omega_o$, where $<\gamma>$=mean Lorentz factor of the compressed overdense $e^+e^-$ plasma). The physics of the subsequent evolution after transmission may be similar to that of the diamagnetic relativistic pulse accelerator (DRPA) mechanism, as described, for example, by E. Liang, K. Nishimura, H. Li, S. P. Gary, *Phys. Rev. Lett.* 90, 085001 (2003), E. Liang, K. Nishimura, Phys. *Rev. Lett.* 92, 175005 (2004), and K. Nishimura, E. Liang, *Phys. Plasmas* 11 (10) (2004).

FIGS. 8a, 8b, 8c, and 8d show the simulated evolution of two linearly polarized plane electromagnetic (EM) pulses ($I(\lambda/\mu m)^2 = 10^{21} W/cm^2$, $c\tau = \lambda/2$) irradiating an overdense $e^+e^-$ plasma ($n_o = 15 n_{cr}$, thickness $= \lambda/2$, kT=2.6keV) from opposite sides. The Figures show plots of magnetic field $B_y$(800), electric field $E_z$(810), current density $J_z$(820), and longitudinal momentum $p_x/m_e c$ vs. x (inset) at $t\omega_o/2\tau = 1.25$ (FIG. 8a), at $t\Omega_o/2\tau = 1.5$ (FIG. 8b), and at $t\omega_o/2\tau = 1.75$ (FIG. 8c). FIG. 8d shows snapshots of the longitudinal momentum $p_x/m_e c$ vs. x for the right-moving pulse at $t\omega_o/2\tau = 2.5$ (as shown at 830), at $t\omega_o/2\tau = 5$ (as shown at 840), at $t\omega_o/2\tau = 10$ (as shown at 850), and at $t\omega_o/2\tau = 22.5$ (as shown at 860), showing power law growth of $\gamma_{max} t^{0.45}$. The Figure also shows profiles of the magnetic field $B_y$ (800) and the electric field $E_z$ (810) at $t\omega_o/2\tau = 22.5$.

It is noted that FIGS. 8a, 8b, 8c, and 8d, and FIG. 5, show the evolution of two linearly polarized plane half-cycle electromagnetic (EM) pulses 100 and 110 with parallel B, irradiating a thin $e^+e^-$ slab 530 from opposite sides. It will b understood that the evolution two pulses with nonparallel B may be more complex. With reference to FIG. 8a, each incident electromagnetic (EM) pulse 100 and/or 110 compresses and accelerates the $e^+e^-$ plasma 530 inward, reaching a terminal Lorentz factor $\gamma_{max} \sim (\Omega_e/\omega_{pe})^2 \sim 40$ as shown in FIGS. 7a and 7b. Only about 10% of the incident amplitudes may be reflected because the laser reflection front is propagating inward relativistically, as described, for example, by W. L. Kruer, E. J. Valeo, K. G. Estabrook, *Phys. Rev. Lett.* 35, 1076 (1975). As the skin currents from both sides start to merge, as shown in FIG. 8b, the two ultra-intense laser (UL) pulses 100 and 110 interpenetrate and tunnel through the $e^+e^-$ plasma 530, despite $\omega_{pe} > <\gamma> \omega_o$. Such transmission of electromagnetic (EM) waves through an overdense $e^+e^-$ plasma 530 can not be achieved using a single ultra-intense laser (UL) pulse, because there the plasma thickness remains >>2 relativistic skin depths.

During transmission, the B fields of the opposing pulses 100 and 110 add while E fields cancel, as shown in FIG. 8b, setting up a state similar to the diamagnetic relativistic pulse accelerator (DRPA) initial state, and the subsequent evolution may resemble that of the diamagnetic relativistic pulse accelerator (DRPA), as described, for example, by E. Liang, K. Nishimura, H. Li, S. P. Gary, *Phys. Rev. Lett.* 90, 085001 (2003), E. Liang, K. Nishimura, *Phys. Rev. Lett.* 92, 175005 (2004), and K. Nishimura, E. Liang, *Phys. Plasmas* 11 (10) (2004). As the transmitted ultra-intense laser (UL) pulses 100 and 110 reemerge from the overdense $e^+e^-$ plasma 530, they induce new drift currents J at the trailing edge of the pulses, as shown in FIG. 8c, with opposite signs to the initial currents, as shown in FIGS. 8a and 8b, so that the new J×B forces accelerate the surface plasma outward. It is noted that plasma loading, which slows the transmitted ultra-intense laser (UL) pulses 100 and 110, plays an important role in sustaining this comoving acceleration.

A parameter study shows that for a given $\Omega_e/\omega_{pe}$, the higher the $e^+e^-$ plasma 530 density the more sustained is the comoving acceleration, and a larger fraction of the plasma slab 530 is accelerated. This unique feature may distinguish such an overdense scheme from the underdense schemes such as Laser Wake Field Acceleration (LWFA), Plasma Wake Field Acceleration (PWFA), Plasma Beat Wave Acceleration (PBWA), which are described, for example, by E. Esarey, P. Sprangle, J. Krall, A. Ting, IEEE Trans. Plasma Sci. 24, 252

(1996), P. Sprangle, E. Esary, A. Ting, *Phys. Rev. Lett.* 64, 2011 (1990), V. Malka, in *AIP Conf. Proc. No.* 611, p. 303, Ed. M. Lontano et al. (AIP, NY, 2002), A. Pukhov, J. Meyer-ter-Vehn, *Phys. Rev. Lett.* 79, 2686 (1997), T. Tajima and J. M. Dawson, *Phys. Rev. Lett.* 43, 267 (1979), and Free Wave Acceleration (FWA), which is described, for example, by M. S. Hussein, M. P. Pato, A. K. Kerman, *Phys. Rev. A* 46, 3562 (1992), M. S. Hussein, M. P. Pato, *Phys. Rev. Lett.* 68, 1992, S. Kawata, T. Maruyama, H. Watanabe, I. Takahashi, *Phys. Rev. Lett.* 66, 2072 (1991), J. G. Woodworth, M. N. Kreisler, A. K. Kerman, *The Future of Accelerator Phys*. p. 378, Ed. T. Tajima (AIP, NY 1996). As slower particles gradually dephase from the ultra-intense laser (UL) pulses 100 and 110, the plasma loading decreases with time. This leads to continuous acceleration of both the ultra-intense laser (UL) pulses 100 and 110 and the dwindling population of fast particles. The phase plot evolution of this colliding pulses accelerator CPA 500, as shown in FIG. 8d, may resemble that of the diamagnetic relativistic pulse accelerator (DRPA) described, for example, by E. Liang, K. Nishimura, H. Li, S. P. Gary, *Phys. Rev. Lett.* 90, 085001 (2003), E. Liang, K. Nishimura, *Phys. Rev. Lett.* 92, 175005 (2004), and K. Nishimura, E. Liang, *Phys. Plasmas* 11 (10) (2004).

It will be understood that the use of half-cycle pulses as ultra-intense laser (UL) pulses 100 and 110 is only exemplary Any suitable pulse shapes (e.g., Gaussian pulse trains) can be used for producing relativistic particles in accordance with the principles of the present invention. FIGS. 9a, 9b, 9c, and 9d show, for example, simulation results of two Gaussian pulse trains ($\lambda=1$ μm, $I=10^{21}$ W/cm$^2$, $c\tau=85$fs) irradiating an $e^+e^-$ plasma ($n_o=9n_{cr}$, thickness=$2\lambda/\pi$, kT=2.6 keV). FIG. 9a shows early magnetic field $B_y$ and density ratio $n_o/n_{cr}$ profiles at $t\omega_o=0$, and FIG. 9b shows a plot of $\log(p_x/m_ec)$ vs. logx for the right-moving pulse at $t\omega_o=180$ (as shown at 920), at $t\omega_o=400$ (as shown at 930), at $t\omega_o=800$ (as shown at 940), at $t\omega_o=1600$ (as shown at 950), at $t\omega_o=2400$ (as shown at 960), at $t\omega_o=4000$ (as shown at 970), and at $t\omega_o=4800$ (as shown at 980). The profiles exhibit power-law growth of $\gamma_{max}\sim t^{0.8}$. FIG. 9c shows detailed profiles of the left-moving pulse at $t\omega_o=4800$ for $p_x/10000$ (black dots, as shown at 925), $B_y/100$ (as shown at 905), and $n/n_{cr}$ (as shown at 910) vs. x. The profiles indicate that the back-half of the ultra-intense laser (UL) pulse has mostly decayed, with its energy having been transferred to the particles. FIG. 9d shows the evolution of the logarithm of the electron energy distribution log ($f(\gamma)$) vs. log ($\gamma$), exhibiting the build-up of power-law behavior below $\gamma_{max}$ with slope$\sim-1$, at $t\omega_o=180$ (as shown at 935), at $t\omega_o=400$ (as shown at 945), at $t\omega_o=800$ (as shown at 955), at $t\omega_o=2400$ (as shown at 965), and at $t\omega_o=4800$ (as shown at 930), where slope=-1 means an equal number of particles per decade of energy.

FIGS. 9a, 9b, 9c, and 9d show the results of irradiating an overdense $e^+e^-$ plasma slab 530 using practical Gaussian pulse trains ($\lambda=1$ μm, pulse length $\tau=85$fs, $I_{peak}=10^{21}$ W cm$^{-2}$). The Figures show that $\gamma_{max}$ increases rapidly to 2200 by 1.28 ps and 3500 by 2.56 ps, unconstrained by the ponderomotive limit $a_o^2/2$ (~360). FIG. 9d shows that the asymptotic momentum distribution forms a power-law with slope$\sim-1$ below the maximum Lorentz factor $\gamma_{max}(t)\sim e\int E(t) dt/mc$, which is distinct from the exponential distribution of ponderomotive heating described, for example, by W. L. Kruer, K. G. Estabrook, *Phys. Fluids* 28, 430 (1985) and/or S. C. Wilks, W. L. Kruer, M. Tabak, A. B. Langdon, *Phys. Rev. Lett.* 69, 1383 (1992), C. Gahn et al *Phys. Rev. Lett.* 83, 4772 (1999); P. X. Wang et al., *App. Phys. Lett.* 78, 2253 (2001), and Z. M. Sheng, K. Mima, J. Zhang, J. Meyer-ter-Vehn, *Phys. Rev. E* 69, 016407 (2004). Here, E(t) is the ultra-intense laser (UL) electric field comoving with the highest energy particles. FIG. 9c shows that E(t) decreases with time due to electromagnetic (EM) energy transfer to the particles, and is accompanied by slow dephasing of particles from the ultra-intense laser (UL) pulse 100 and 110 peak. This leads to sub-linear energy growth with $\gamma_{max}\sim t^{0.8}$, as shown in FIG. 9b. This quasi-power-law momentum distribution may be formed because there is no other preferred energy scale below $\gamma_{max}$, and the particles have random phases with respect to the electromagnetic (EM) field. In practice, $\gamma_{max}$ will be limited by the diameter D of the laser focal spot, since particles drift transversely out of the laser field after a t~t-D/c. The maximum energy of any comoving acceleration is thus $<eE_oD=6$GeV$(I/10^{21}$Wcm$^{-2})^{1/2}$(D/100 μm).

Parameter studies of colliding pulses accelerator CPA 500 have been conducted. FIGS. 10a, 10b, 10c, and 10d schematically illustrate a comparison of the logarithm of the electron energy distribution log ($f(\gamma)$) vs. log ($\gamma$) at equal times when a single input parameter is varied. FIG. 10a shows the result of varying the magnitude of the vector potential for $a_o=1.9$, 19, and 190 at $t\omega_o/2\tau=22.5$. FIG. 10b shows the result of varying the pulse length $\tau$ for $c\tau=\lambda/2$, $\lambda$, $4\lambda$, $7\lambda$, and $26\lambda$ at $t\omega_o/2\tau=22.5$. FIG. 10c shows the results of varying the ratio of the density to the critical density for $n_o/n_{cr}=9$, 25, and 0.001 at $t\omega_o=4800$. FIG. 10d shows the plot of $\gamma$ vs. $\theta$ (=$|p_z|/|p_x|$) at $t\omega_o=4800$ for the Gaussian pulse trains irradiation simulation shown in FIGS. 9a, 9b, 9c, and 9d. The plot shows strong energy-angle selectivity and narrow beaming of the most energetic particles.

The parameter studies of the colliding pulses accelerator CPA 500 recognize that $\gamma_{max}$ is not the only figure of merit for comparing acceleration efficiency The parameter studies, for example, compared the overall particle energy distributions at equal times for different parameter combinations. For example, FIG. 10a shows the effects of varying vector potential $a_o$ while fixing other parameters. Both the power-law slope and $\gamma_{max}$ increase with $a_o$. FIG. 10b shows the effect of increasing the pulse length $\tau$ while fixing other parameters. The Figures show that at first $\gamma_{max}$ increases and the power-law slope stays approximately constant, but for very long pulses $\gamma_{max}$ becomes fixed while the slope hardens. FIG. 10c shows the effect of varying the target density n while fixing other parameters. For comparison, the FIG. 10a-10c also include the result of an underdense example (n=$10^{-3}n_{cr}$ bottom curve, as shown at 1050). While all three parameter variation cases produce similar $\gamma_{max}$, the underdense example shows a smaller fraction of particles being accelerated, because the plasma loading is too low to effectively slow down the ultra-intense laser (UL) pulses 100 and 110. The physics of the underdense CPA may be related to the physics of the free wave accelerator (FWA) in which an opposing laser substitutes for the symmetry-breaking electrostatic/magnetostatic field as described, for example, by M. S. Hussein, M. P. Pato, A. K. Kerman, *Phys. Rev. A* 46, 3562 (1992), M. S. Hussein, M. P. Pato, *Phys. Rev. Lett.* 68, 1992, S. Kawata, T. Maruyama, H. Watanabe, I. Takahashi, *Phys. Rev. Lett.* 66, 2072 (1991), J. G. Woodworth, M. N. Kreisler, A. K. Kerman, *The Future of Accelerator Phys*. p. 378, Ed. T. Tajima (AIP, NY 1996)However, as FIG. 10c shows, the overdense colliding pulses accelerator (CPA) 500 is more effective than the FWA in terms of energy coupling and the fraction of plasma accelerated. FIG. 10d shows the energy-angle dependence for the Gaussian pulse trains irradiation simulation shown in FIGS. 9a, 9b, 9c, and 9d indicating that the most energetic particles are narrowly beamed, providing excellent energy-angle selectivity for potential applications.

It is noted that CPA 500 and alternate embodiments of the colliding pulse accelerator require a dense and intense $e^+e^-$ plasma 530 source. Such plasma sources are practical. For example, T. E. Cowan et al., *Laser Part. Beams* 17, 773 (1999); T. E. Cowan et al., *Phys. Rev. Lett.* 84, 903 (2000), have demonstrated that such an $e^+e^-$ source may be achieved by using a petawatt (PW) laser 560 striking a gold foil 520. Further, theoretical work, described, for example, by E. P. Liang, S. C. Wilks, M. Tabak, *Phys. Rev. Lett.* 81, 4887 (1998); B. Shen, J. Meyer-ter-Vehn, *Phys. Rev. E* 65, 016405 (2001) suggest that $e^+e^-$ plasma 530 densities $n > 10^{22} cm^{-3}$ may be achieved with sufficient laser fluence. Such a high density $e^+e^-$ plasma 530 jet may be slit-collimated (e.g., by collimators 540, FIG. 5) to produce a thin slab of an $e^+e^-$ plasma 530 about a micron thick, which can be subject to 2-sided irradiation with opposite ultra-intense laser (UL) pulses 100 and 110.

It is further noted that CPA 500 and alternate embodiments of the colliding pulse accelerator require intense radiation pulse source. Such intense radiation pulse source are practical. For example, CPA 500 may use ultra-intense laser (UL) pulses 100 and 110 with $\tau=80fs$ and intensity=$10^{19} Wcm^{-2}$. Further, a focal spot diameter $D>600 \mu m$ may be used so that the $e^+e^-$ pairs remain inside the beam for $>1$ ps. This requirement translates into about 1KJ energy per ultra-intense laser (UL) pulse 100 and 110. Such high-energy ultra-intense lasers (ULs) are under construction at several sites, as described, for example, by the *SAUUL Report*, T. Ditmire, Ed. (UT Austin, 2003).

It is noted that various properties and features of the colliding particle accelerators and methods for production of relativistic particles described herein may be based on 2.5D simulations of $e^-e^+$ plasma slabs 530. It may be expected that 3D simulation results will confirm the stability and robustness of the colliding pulses accelerators and methods described herein. Further, the colliding particle accelerators and methods for production of relativistic particles are not restricted to $e^-e^+$ plasmas, but can be used with $e^-$-ion plasmas. For very thin $e^-$-ion plasma slabs 530, which can be compressed to <two skin depths, in the colliding pulses accelerator (e.g., CPA 500) most of the irradiation energy is eventually transferred to the ions via charge separation in a manner similar to the $e^-$-ion diamagnetic relativistic pulse accelerator (DRPA), as described, for example, by E. Liang, K. Nishimura, H. Li, S. P. Gary, *Phys. Rev. Lett.* 90, 085001 (2003), E. Liang, K. Nishimura, *Phys. Rev. Lett.* 92, 175005 (2004), K. Nishimura, E. Liang, *Phys. Plasmas* 11 (10) (2004), and K. Nishimura, E. Liang, S. P. Gary, *Phys. Plasmas* 10, 4559 (2003).

It will be understood that the particular embodiments of the invention disclosed herein are illustrative only, and that the present invention may be modified and practiced in different but equivalent manners apparent to those skilled in the art having the benefit of the teachings herein. Furthermore, no construction or design limitations are intended by the details of construction or design described herein, other than as described in the claims below. It is therefore evident that the particular illustrative embodiments disclosed above may be altered or modified and all such variations are considered within the scope and spirit of the present invention. In particular, every range of values (e.g., of the form, "from about a to about b," or, equivalently, "from approximately a to b," or, equivalently, "from approximately a-b") disclosed herein is to be understood as referring to the power set (the set of all subsets) of the respective range of values in the sense of Georg Cantor. Accordingly, the protection sought herein is as set forth in the claims below.

Therefore, the present invention is well adapted to attain the ends and advantages mentioned as well as those that are inherent therein. While numerous changes may be made by those skilled in the art, such changes are encompassed within the spirit of this present invention as defined by the appended claims.

What is claimed is:

1. A method for accelerating particles to about relativistic velocities, the method comprising:
    producing a plasma;
    collimating the plasma; and
    striking at least a portion of the collimated plasma substantially simultaneously with two counter-propagating ultra-intense laser (UL) electromagnetic (EM) pulses to transfer energy to particles in the plasma and thereby to accelerate the particles.

2. The method of claim 1, wherein producing the plasma further comprises striking a foil with a pulse from a petawatt laser.

3. The method of claim 2, wherein the foil comprises a high-Z material.

4. The method of claim 1, wherein producing the plasma further comprises producing at least one of an $e^+e^-$ plasma, an $e^-$-ion plasma and any combination thereof.

5. The method of claim 1, wherein the plasma is an overdense plasma.

6. The method of claim 1, wherein collimating the plasma further comprises collimating the plasma into a thin slab no thicker than about a wavelength of the ultra-intense laser (UL).

7. The method of claim 1, further comprising converting the particles accelerated by the two counter-propagating ultra-intense laser (UL) electromagnetic (EM) pulses striking the at least a portion of the collimated plasma substantially simultaneously into other relativistic particles.

8. A device for producing relativistic particles, the device comprising:
    a plasma;
    a collimator capable of collimating the plasma; and
    a laser arrangement comprising at least one ultra-intense laser (UL), wherein the laser arrangement is configured to produce two counter-propagating ultra-intense laser (UL) electromagnetic (EM) pulses striking at least a portion of the collimated plasma substantially simultaneously, and thereby transferring laser pulse energy to accelerate particles in the plasma.

9. The device of claim 8, further comprising a petawatt laser configured to strike a foil with a petawatt laser pulse to produce the plasma.

10. The device of claim 9, wherein the foil comprises a high-Z material.

11. The device of claim 8, wherein the plasma comprises one of an e+e– plasma, an e--ion plasma, and any combination thereof.

12. The device of claim 8, wherein the plasma is an overdense plasma.

13. The device of claim 8, wherein the collimator is configured to collimate the plasma into a thin slab no thicker than about a wavelength of the ultra-intense laser (UL).

14. The device of claim 8, further comprising:
    a converter configured to convert the particles accelerated by the two counter-propagating ultra-intense laser (UL) electromagnetic (EM) pulses striking the at least a portion of the collimated plasma substantially simultaneously into other relativistic particles.

15. A device for producing relativistic particles, the device comprising:
- means for producing a plasma;
- means for collimating the plasma; and
- means for striking at least a portion of the collimated plasma substantially simultaneously with two counter-propagating ultra-intense laser (UL) electromagnetic (EM) pulses, and thereby transferring laser pulse energy to accelerate particles in the plasma.

16. The device of claim 15, wherein the means for producing the plasma further comprises means for striking a foil with a petawatt laser pulse.

17. The device of claim 16, wherein the foil comprises a high-Z material.

18. The device of claim 15, wherein the means for producing the plasma further comprises means for producing at least one of an $e^+e^-$ plasma, an $e^-$-ion plasma, and any combination thereof.

19. The device of claim 15, wherein the means for producing the plasma further comprises means for producing an overdense plasma.

20. The device of claim 15, wherein the means for collimating the plasma further comprises means for collimating the plasma into a thin slab no thicker than about a wavelength of the ultra-intense laser (UL).

21. The device of claim 15, further comprising means for converting the particles accelerated by the two counter-propagating ultra-intense laser (UL) electromagnetic (EM) pulses striking the at least a portion of the collimated plasma substantially simultaneously into other relativistic particles.

* * * * *